(12) United States Patent
Fukunaka et al.

(10) Patent No.: US 10,656,080 B2
(45) Date of Patent: May 19, 2020

(54) GAS DETECTION APPARATUS

(71) Applicant: Asahi Kasei Microdevices Corporation, Chiyoda-ku, Tokyo (JP)

(72) Inventors: Toshiaki Fukunaka, Tokyo (JP); Edson Gomes Camargo, Tokyo (JP)

(73) Assignee: Asahi Kasei Microdevices Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/503,533

(22) Filed: Jul. 4, 2019

(65) Prior Publication Data
US 2020/0011788 A1 Jan. 9, 2020

(30) Foreign Application Priority Data

Jul. 6, 2018 (JP) .................................. 2018-128716
Aug. 14, 2018 (JP) .................................. 2018-152652
Sep. 18, 2018 (JP) .................................. 2018-173760
May 24, 2019 (JP) .................................. 2019-097841

(51) Int. Cl.
*G01N 21/3504* (2014.01)
*G01N 21/359* (2014.01)
*G02B 6/136* (2006.01)
*G01D 5/353* (2006.01)

(52) U.S. Cl.
CPC ..... *G01N 21/3504* (2013.01); *G01D 5/35374* (2013.01); *G01N 21/359* (2013.01); *G02B 6/136* (2013.01); *G01N 2201/061* (2013.01); *G01N 2201/0635* (2013.01); *G01N 2201/088* (2013.01); *G01N 2201/0846* (2013.01)

(58) Field of Classification Search
None
See application file for complete search history.

(56) References Cited

U.S. PATENT DOCUMENTS

| | | | | |
|---|---|---|---|---|
| 5,060,508 | A * | 10/1991 | Wong | .................... G01N 1/2258 |
| | | | | 356/437 |
| 5,834,777 | A * | 11/1998 | Wong | ................. G01N 21/0303 |
| | | | | 250/343 |
| 2013/0258345 | A1* | 10/2013 | Lin | ..................... G01N 21/3504 |
| | | | | 356/437 |
| 2015/0129767 | A1* | 5/2015 | Kouznetsov | ....... G01N 21/0303 |
| | | | | 250/341.1 |
| 2015/0205062 | A1 | 7/2015 | Collins et al. | |

(Continued)

FOREIGN PATENT DOCUMENTS

| | | |
|---|---|---|
| EP | 0965835 A2 | 12/1999 |
| JP | H08278429 A | 10/1996 |

(Continued)

*Primary Examiner* — Michael Stahl
(74) *Attorney, Agent, or Firm* — Kenja IP Law PC

(57) ABSTRACT

A gas detection apparatus (100) includes a first layer (1) and a second layer (2) disposed opposite the first layer (1) in a predetermined direction (z-axis direction). The first layer (1) includes a light emitter that emits light and a light receiver that receives the light after the light passes through a waveguide. The second layer (2) includes a light input unit of the waveguide opposite the light emitter in the predetermined direction (z-axis direction) and a light output unit of the waveguide opposite the light receiver in the predetermined direction (z-axis direction). The gas detection apparatus (100) can be miniaturized.

20 Claims, 26 Drawing Sheets

(56) References Cited

U.S. PATENT DOCUMENTS

2016/0054220 A1   2/2016  Nishijima et al.
2017/0343419 A1*  11/2017 Hopper ................... H01L 35/32
2018/0164208 A1   6/2018  Gylfason et al.
2019/0064061 A1*  2/2019  Gudeman ............... H01S 5/183

FOREIGN PATENT DOCUMENTS

| | | |
|---|---|---|
| JP | H11326193 A | 11/1999 |
| JP | 2007086483 A | 4/2007 |
| JP | 2009250858 A | 10/2009 |
| JP | 2010203838 A | 9/2010 |
| JP | 2011133290 A | 7/2011 |
| JP | 2014211362 A | 11/2014 |
| JP | 2015216231 A | 12/2015 |
| JP | 2016223804 A | 12/2016 |
| JP | 2017015567 A | 1/2017 |
| JP | 2017026547 A | 2/2017 |
| JP | 2017054132 A | 3/2017 |
| JP | 2018040968 A | 3/2018 |
| JP | 2018521322 A | 8/2018 |
| KR | 1020070067527 A * | 6/2007 |

* cited by examiner

FIG. 2
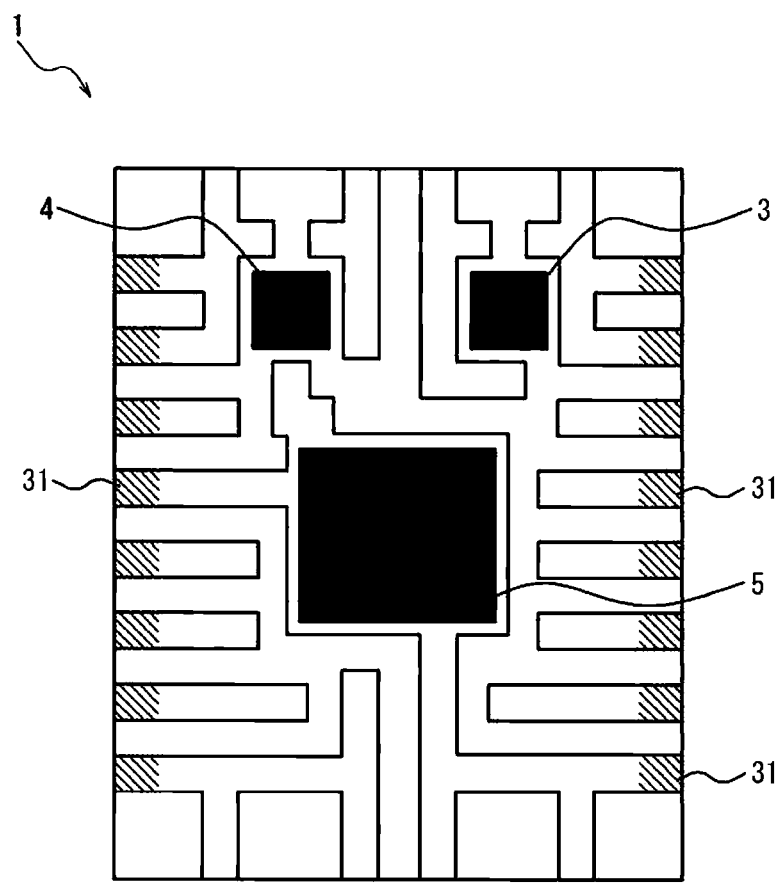
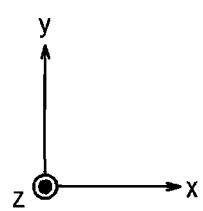

FIG. 11
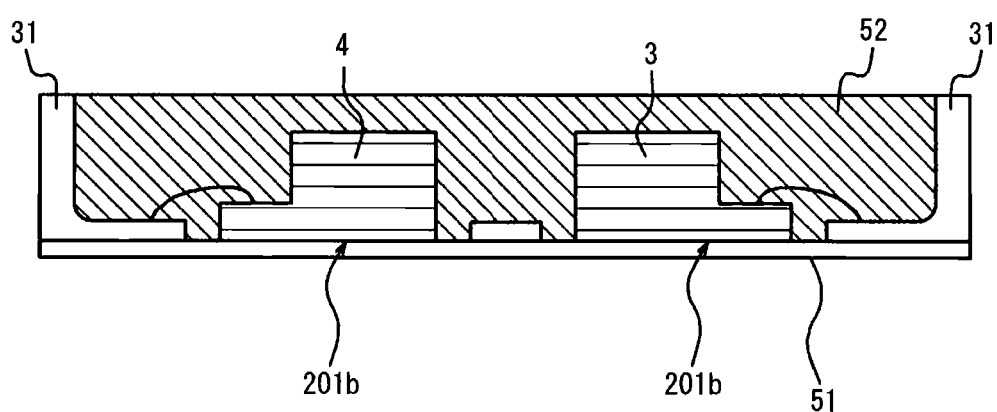
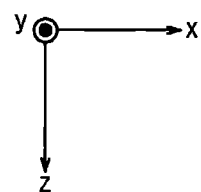

15  16

15 16

GAS DETECTION APPARATUS

TECHNICAL FIELD

The present disclosure relates to a gas detection apparatus.

BACKGROUND

Gas detection apparatuses for detecting gases are used in various fields. For example, gas detection apparatuses can be used to detect the concentration of a gas targeted for detection and acquire data for measuring an indoor or outdoor environment. Patent literature (PTL) 1, for example, discloses a gas detection apparatus that includes a near-infrared light source and a light detection unit and detects the concentration of a gas inside a gas cell by non-dispersive infrared (NDIR).

A gas detection apparatus that includes a waveguide for light, instead of a gas cell, is also known. PTL 2, for example, discloses a gas detection apparatus in which an optical waveguide layer forming a waveguide is in contact with a reactive film that reacts to a gas. The gas detection apparatus detects the concentration of the gas based on attenuation of light in the waveguide.

CITATION LIST

Patent Literature

PTL 1: JP2014-211362A
PTL 2: JP2009-250858A
PTL 3: JP2018-040968A
PTL 4: JP2017-054132A

SUMMARY

In the gas detection apparatus disclosed in PTL 2, a light source (laser diode LD) and a waveguide (optical waveguide layer 11) are disposed separately on the flat surface of a substrate, for example as illustrated in FIG. 3. A number of prisms for guiding light from the light source to the waveguide are also disposed on the same surface of the substrate. This makes miniaturization of the gas detection apparatus disclosed in PTL 2 difficult.

In the light module disclosed in PTL 3, for example, the position of the light source (light element 18) can be adjusted by a pedestal. Light from the light source is therefore caused to enter the waveguide directly, without passing through a prism. The light module disclosed in PTL 3, however, is structured so that the light source and the waveguide, which each occupy a certain area, are disposed side-by-side on the flat surface of the substrate 11. Therefore, even when the structure of the light module disclosed in PTL 3 is applied, there is still room for improvement in miniaturization of the gas detection apparatus.

The light interposer disclosed in PTL 4, for example, emits light from a light source (single mode VCSEL 121) in a substantially perpendicular direction to the waveguide. It is thus easier to miniaturize the optical interposer disclosed in PTL 4 in the planar direction as compared to the structure of PTL 3. The optical interposer disclosed in PTL 4, however, is structured so that a diffraction grating and a wedge-shaped optical component are disposed between the light source and the waveguide. Therefore, even when the structure of the light interposer disclosed in PTL 4 is applied, there is still room for improvement in miniaturization of the gas detection apparatus.

The present disclosure provides a gas detection apparatus that can be miniaturized more than with known techniques.

A gas detection apparatus according to the present disclosure includes a first layer and a second layer disposed opposite the first layer in a predetermined direction. The first layer includes a light emitter that emits light and a light receiver that receives the light after the light passes through a waveguide. The second layer includes a light input unit of the waveguide opposite the light emitter in the predetermined direction and a light output unit of the waveguide opposite the light receiver in the predetermined direction.

The present disclosure can provide a gas detection apparatus that can be miniaturized.

BRIEF DESCRIPTION OF THE DRAWINGS

In the accompanying drawings:

FIG. 2 illustrates an example configuration of a first layer;

FIG. 11 illustrates an example cross-section of the first layer during a production process;

DETAILED DESCRIPTION

Figure 1:
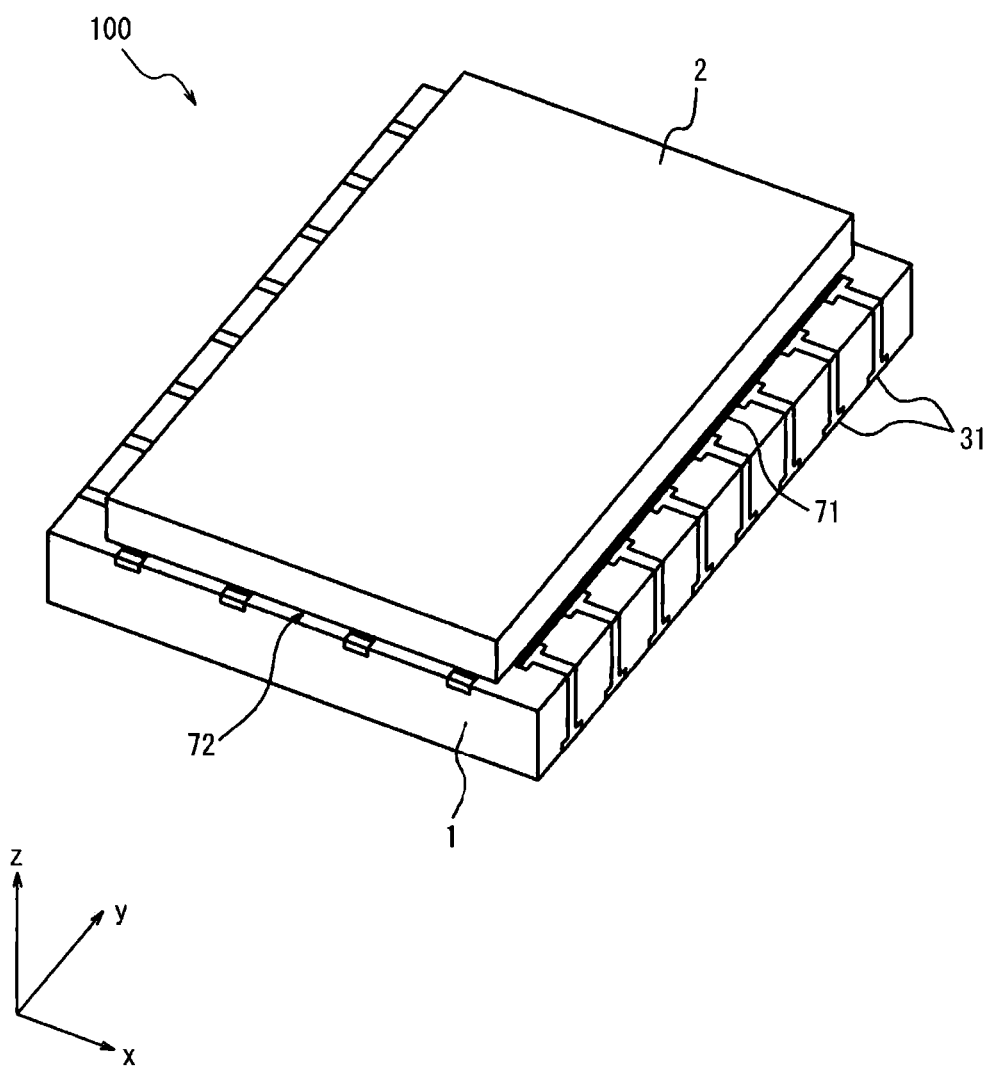
FIG. 1 is a perspective view illustrating an example appearance of a gas detection apparatus according to a first embodiment of the present disclosure.

Embodiments of the present disclosure are described below with reference to the drawings. Portions with identical configurations are labeled with the same reference signs in the drawings described below, and a repetitious explanation is omitted in some cases.

A number of particular configurations are explained below in detail to provide a complete understanding of embodiments of the present disclosure. The present disclosure is not, however, limited by these particular configurations and may be embodied in other ways. Furthermore, the drawings are merely schematic, and the relationships between thickness and planar dimensions, the ratio of thickness of each layer, and the like are not to scale.

First Embodiment

Configuration of Gas Detection Apparatus

FIG. 1 is a perspective view illustrating an example appearance of a gas detection apparatus 100 (gas sensor) according to the present embodiment. As illustrated in FIG. 1, the gas detection apparatus 100 includes a first layer 1 and a second layer 2. The second layer 2 is arranged opposite the first layer 1 in a predetermined direction. When the plane of the first layer 1 and the second layer 2 is the xy plane that includes the x-axis and the y-axis, the predetermined direction is the z-axis direction. As used herein, "opposite" is not limited to the case of the first layer 1 and the second layer 2 being parallel. For example, "opposite" includes a state in which one of the layers faces the other at a predetermined inclination (angle) without the two layers touching.

The first layer 1 and the second layer 2 are connected by an attachment portion 71. In the present embodiment, the attachment portion 71 is provided in a line on terminals 31 of the first layer 1. The terminals 31 are configured by a conductor, such as metal, and allow an electrical connection with a device, a power source, and the like external to the gas detection apparatus 100. Here, vents 72 (openings) that communicate with the below-described waveguide are provided in portions (gaps) where the attachment portion 71 is not provided. The gas detection apparatus 100 is placed in a measurement environment and detects the concentration of a gas that enters through the vents 72. Here, the first layer 1, the second layer 2, and the attachment portion 71 may be configured to include light-blocking resin or metal, for example, so that light from around the gas detection apparatus 100 does not reach a light input unit 81 and a light receiver 4, described below.

Configuration of First Layer

FIG. 2 illustrates an example configuration of the first layer 1. The first layer 1 includes a light emitter 3 and the light receiver 4 for receiving light that passes through the waveguide. In the present embodiment, the first layer 1 has a controller 5 for controlling at least one of the light emitter 3 and the light receiver 4. The light emitter 3, the light receiver 4, and the controller 5 are connected electrically by wire bonding or the like to a lead frame 15 that includes the terminals 31. The portion of the terminals 31 indicated by hatching indicates the portion that extends from one surface of the first layer 1 (the surface where the light emitter 3 and the light receiver 4 are exposed when an adhesive sheet 51 is removed) to the other surface (the surface opposite the one surface), as illustrated in FIG. 11, described below. In the present embodiment, the first layer 1 is configured so that the light emitter 3, the light receiver 4, the controller 5, and the lead frame 15 are sealed by an epoxy resin, for example.

In the present embodiment, the light emitter 3 is a light emitting diode (LED). The light emitter 3 is not limited to being an LED and may, for example, be a semiconductor laser, an organic light emitting element, a micro electro mechanical systems (MEMS) heater, or the like. The light receiver 4 is a photodiode in the present embodiment. The light receiver 4 is a sensor device that receives light, converts the received light into an electrical signal, and outputs the converted electrical signal to the controller 5. The light receiver 4 is not limited to being a photodiode and may, for example, be a phototransistor, a thermopile, or the like. The controller 5 is a processor that includes an LED driver, for example. An example of the controller 5 is the processor "AK9721AE" (product name) produced by Asahi Kasei Microdevices Corporation.

In the present embodiment, the light that the light emitter 3 emits and the light receiver 4 receives is infrared light. The gas to be detected by the gas detection apparatus 100 in the present embodiment is carbon dioxide. The wavelength band of the infrared light that the light emitter 3 emits and the light receiver 4 receives in the present embodiment includes the 4.3 μm band and overlaps with the absorption wavelength band of carbon dioxide. Here, the light emitter 3 is not limited to emitting only infrared light and may emit infrared light and light with a different wavelength from infrared light.

It is known that many specific absorption bands exist for each type of gas in a wavelength range of 2.5 μm to 6.0 μm. The gas detection apparatus 100 can be used to detect not only carbon dioxide but also other gases. Examples of the other gases include water vapor, methane, propane, formaldehyde, carbon monoxide, nitric oxide, ammonium, sulfur dioxide, and alcohol. Examples of alcohol gases may include not only pure ethanol but also an alcohol component, such as ethanol, included in the breath of a person who has imbibed alcohol. For example, as a modification to the present embodiment, the gas detection apparatus 100 can suitably detect methane by using infrared light in the 3.3 μm wavelength band, which overlaps with the absorption wavelength band of methane. The gas detection apparatus 100 is not limited to infrared light and can, for example, use visible light, ultraviolet light, or the like.

Configuration of Second Layer

Figure 3:
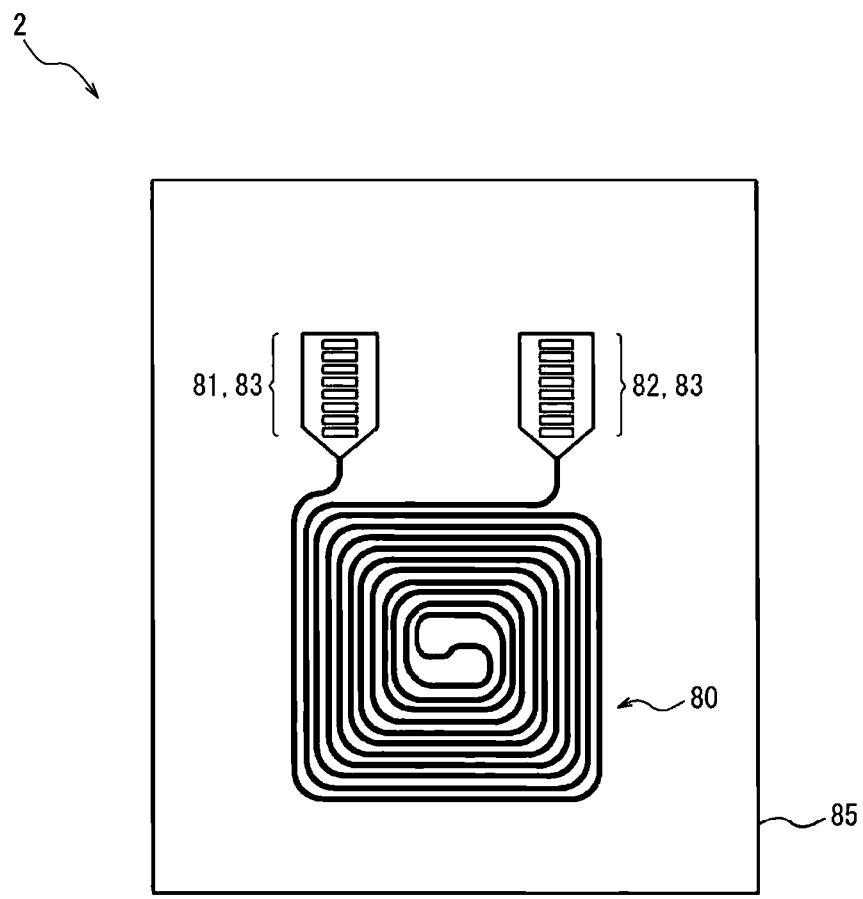
FIG. 3 illustrates an example configuration of a second layer.

FIG. 3 illustrates an example configuration of the second layer 2. The second layer 2 includes a silicon substrate 85 and a waveguide 80. The waveguide 80 includes the light input unit 81, into which light emitted by the light emitter 3 is inputted, and a light output unit 82, from which light that has passed through the waveguide 80 is outputted to the light receiver 4. The light input unit 81 and the light output unit 82 may be positioned at an edge of the waveguide 80 or positioned at a location away from the edge.

In the present embodiment, an optical filter 83 is provided in the section, through which light is guided, from the light input unit 81 to the light output unit 82. The optical filter 83 is a filter for passing light of a specific wavelength. The optical filter 83 may, for example, have the function of transmitting only infrared light. The optical filter 83 may, for example, be a lattice filter that has a lattice structure. The structure and type of the optical filter 83 are not, however, limited to these examples. The light input unit 81 and the light output unit 82 may be a grating coupler that has a lattice structure. Furthermore, as illustrated in FIG. 3, the optical filter 83 and the light input unit 81, or the optical filter 83 and the light output unit 82, may share the same lattice structure. The optical filter 83 may be omitted, or one or more optical filters 83 may be provided. For example, the waveguide 80 may include the optical filter 83 to be in contact with the light input unit 81 or the light output unit 82. The waveguide 80 may instead include the optical filter 83 at a position not in contact with (separated from) the light input unit 81 or the light output unit 82. For example, a ring resonator or a black grating may be inserted in the section from the light input unit 81 to the light output unit 82 as the optical filter 83.

The waveguide 80 is a member that transmits light received from the light input unit 81 to the light output unit 82. When light passes through the waveguide 80, an evanescent wave extends from the surface of the waveguide 80. The absorption rate of the evanescent wave changes in accordance with the concentration of the gas that enters through the vents 72. Accordingly, the concentration of the gas can be detected by measuring the intensity of light outputted from the light output unit 82. In other words, the gas detection apparatus 100 can detect the concentration of a gas based on the amount of light received by the light receiver 4. For highly sensitive detection of a low-concentration gas, the length (optical path length) of the waveguide 80 through which light passes is preferably maximized. The gas detection apparatus 100 according to the present embodiment is configured so that the entire waveguide 80 is included in the second layer 2. As illustrated in FIG. 3, for example, the provision of a curved optical path in the plane (xy plane) of the silicon substrate 85 ensures the optical path length while avoiding an increase in size. As a modification to the present embodiment, the gas detection apparatus 100 may be provided with a multilayer optical path that also extends in the z-axis direction to further lengthen the optical path.

Attachment Portion

The second layer 2 is connected to the first layer 1 by the attachment portion 71. The first layer 1 and the second layer 2 are connected so that, in a predetermined direction (z-axis direction), the light input unit 81 is opposite the light emitter 3, and the light output unit 82 is opposite the light receiver 4. Furthermore, the first layer 1 and the second layer 2 are connected so that the waveguide 80, excluding the light input unit 81 and the light output unit 82, and the controller 5 are opposite each other in the predetermined direction.

Figure 4:
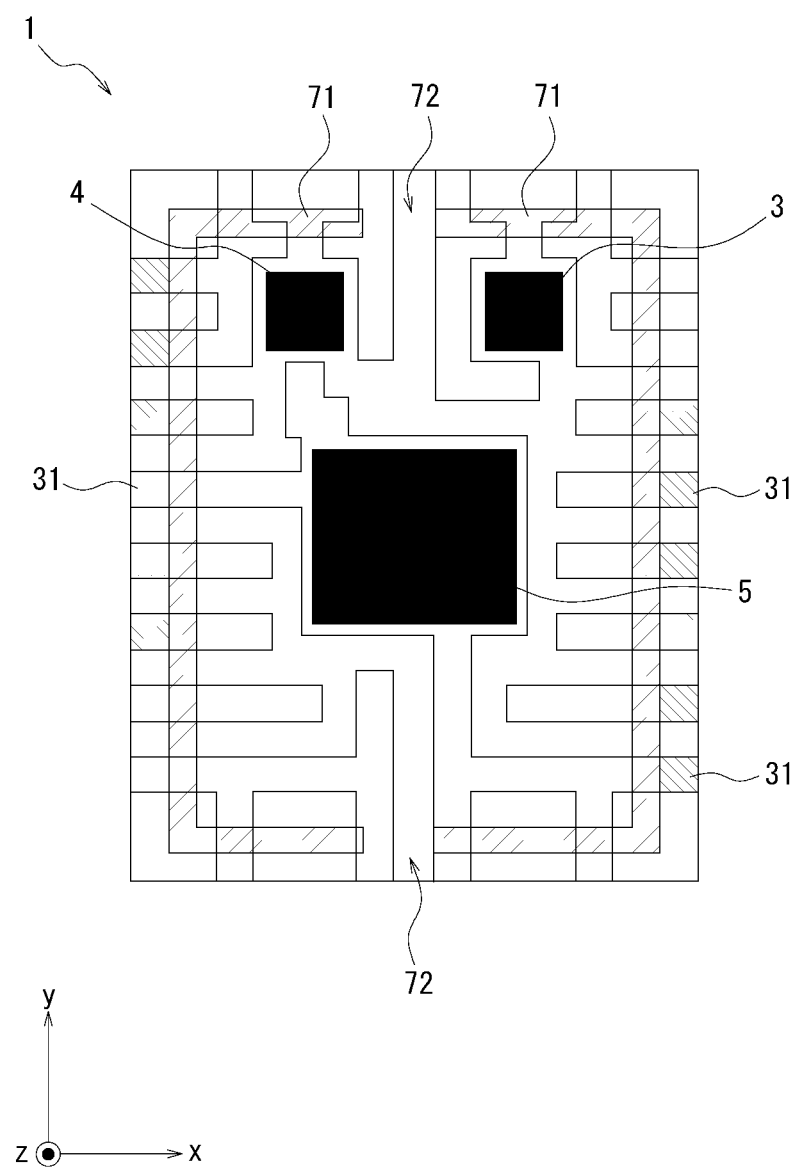
FIG. 4 illustrates an example configuration of vents.

As illustrated in FIG. 4, at least a portion of the attachment portion 71 may include a region with no adhesive so as to form the vents 72. The diffusion rate and penetration anisotropy of the gas to be detected can be controlled by changing the opening area of the vent 72. The dimensions and number of the vents 72 may be set as desired in accordance with use. As illustrated in FIG. 4, penetration inside solder or flux when the gas detection apparatus 100 is mounted can be prevented by the attachment portion 71 being provided in the portion that includes the terminals 31 (mounting terminals).

Figure 5:
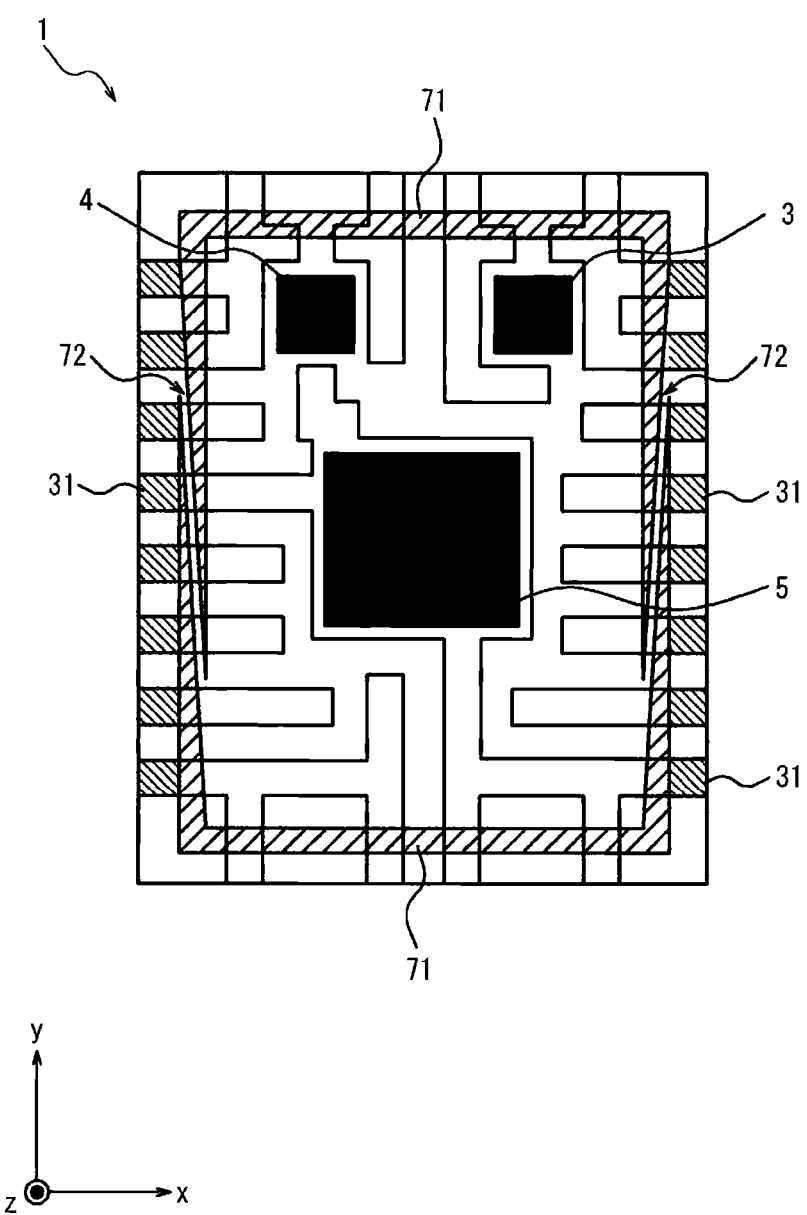
FIG. 5 illustrates another example configuration of vents.

Another preferred method of forming the vent 72 is illustrated in FIG. 5. The vent 72 in FIG. 5 is formed to extend diagonally (in a direction at a certain angle from the x-axis) through adhesive that is formed like a frame with a certain width. In other words, the entrance and exit of the vent 72 are at different positions in the y-axis direction. Penetration of foreign matter from the outside can be prevented by the vent 72 being formed in this way. In this case, the length of the vent 72 is preferably at least √2 times the application width, more preferably at least 2 times the application width. An example method of forming such a vent 72 is to apply epoxy resin in the shape of a frame with a 0.5 mm width and to create an area in a diagonal direction, with a 0.1 mm width, in which no epoxy resin is applied. A plurality of such vents 72 may be formed. As for a specific production method, the vents 72 can be formed by epoxy resin print coating using a metal mask. Particles having a diameter of at least a predetermined value, for example, may optionally be included in the epoxy resin.

The attachment portion 71 can, for example, be configured by hardened adhesive. For example, epoxy resin, phenolic resin, silicone resin, thermosetting resin, UV curing resin, or the like may be used as the adhesive. In addition to print coating, methods that can be used to form the attachment portion 71 include a method for application by drawing with a syringe using a dispenser and a method for application with an inkjet or a jet dispenser.

The attachment portion 71 includes adhesive that, for example, includes particles having a size of a predetermined value or greater. Here, the "size" refers to the diameter of a spherical particle. An example of the predetermined value is 40 μm. The particles are, for example, made of hard resin. Even before the adhesive hardens, an interval of the predetermined value (such as 40 μm) or more is ensured between the first layer 1 and the second layer 2. The vent 72 can therefore reliably be provided when the first layer 1 and the second layer 2 are connected. It suffices for the diameter (predetermined value) of the particles to be a value that ensures a distance such that the first layer 1 does not touch the waveguide 80. In the present embodiment, it suffices for the predetermined value to be greater than the sum of the height of the support 84, described below, and the height of the waveguide 80. As an example, it suffices for the predetermined value to be greater than 3.3 μm when the height of the support 84 is 3 μm and the height of the waveguide 80 is 0.3 μm. As another example, the predetermined value may be calculated by another statistical method (such as the average A or the standard deviation σ) instead of by the smallest particle size. The size of a plurality of particles is obtained by measuring a plurality of particles gathered together by melting the attachment portion 71 or a plurality of particles present in a cross-section of the attachment portion 71. The average and standard deviation σ of the size of a plurality of particles obtained in this way may be used to calculate the predetermined value. For example, the predetermined value may be calculated as "(average A)−2× (standard deviation σ)". Several experiments have indicated that even if deformation occurs in a plurality of particles of the adhesive, an interval of at least A−2σ can be ensured between the first layer 1 and the second layer 2.

The light emitter 3 and the light input unit 81 are preferably close enough to each other in the predetermined direction for light emitted from the light emitter 3 to be sufficiently inputted into the light input unit 81. The light receiver 4 and the light output unit 82 are preferably close enough to each other in the predetermined direction for the light receiver 4 to be sufficiently capable of detecting the light outputted from the light output unit 82. Therefore, the predetermined value is preferably the minimum value in the appropriate range of the interval (the height in the z-axis direction) of the vent 72.

Figure 6:
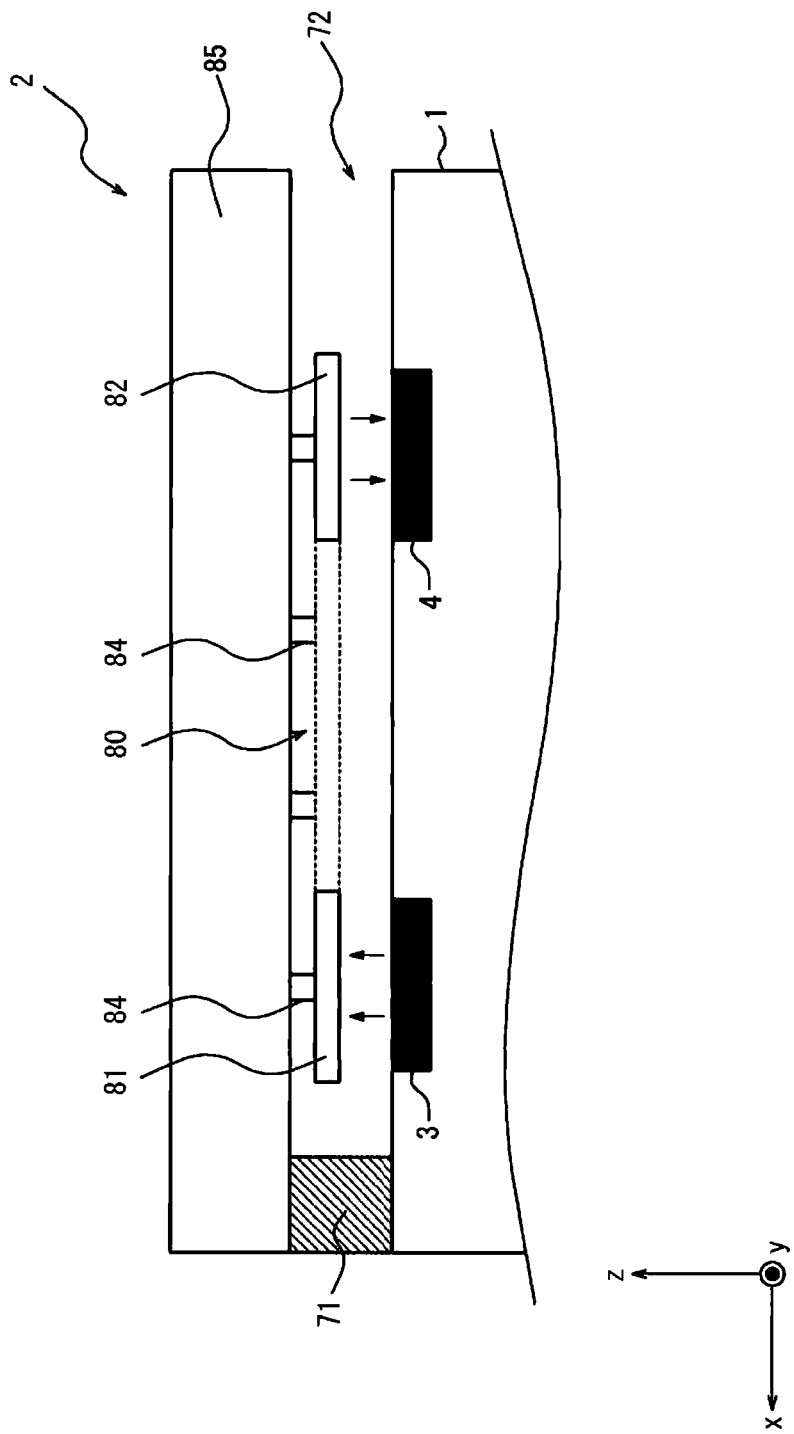
FIG. 6 is a schematic cross-section of an opposing first layer and second layer.

FIG. 6 is a schematic cross-section of the opposing first layer 1 and second layer 2. As illustrated in FIG. 6, the second layer 2 preferably includes supports 84 between the silicon substrate 85 and the waveguide 80 to bring the light emitter 3 and the light input unit 81 closer together. As the light emitter 3 and the light input unit 81 are closer, the attenuation of light between output from the light emitter 3 and input into the light input unit 81 can be reduced. The support 84 can also bring the light receiver 4 and the light output unit 82 closer together. The light receiver 4 and the light output unit 82 can also be brought closer together through adjustment of the thickness of the attachment portion 71. As the light receiver 4 and the light output unit 82 are closer, the attenuation of light between output from the light output unit 82 and reception by the light receiver 4 can be reduced.

The maximum distance that can withstand attenuation of light is equal to or less than the length of the longest side among the sides of the light emitter 3 and the light receiver 4, which are rectangular, for example. The maximum distance is preferably equal to or less than 0.5 times the length of the longest side. When the maximum distance is thus equal to or less than the length of the longest side, the solid angle created by the light input unit 81 when the light input unit 81 is viewed from the light emitter 3 grows wider. Consequently, the proportion of light that reaches the light input unit 81 after being emitted from the light emitter 3 towards the light input unit 81 increases, allowing light to be guided efficiently to the light input unit 81. Similarly, when the maximum distance is equal to or less than the length of the longest side, the solid angle created by the light receiver 4 when the light receiver 4 is viewed from the light output unit 82 grows wider. Consequently, the proportion of light that reaches the light receiver 4 after being emitted from the light output unit 82 towards the light receiver 4 increases, allowing light to be guided efficiently to the light receiver 4.

Figure 7:
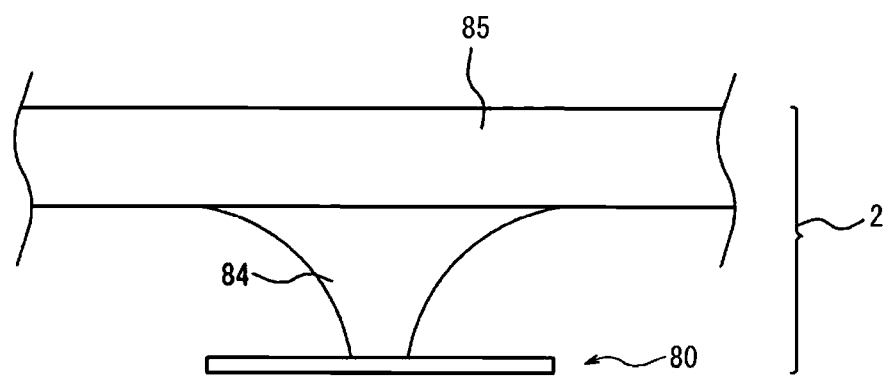
FIG. 7 illustrates an example configuration of a support.

FIG. 7 illustrates an example configuration of the support 84. The support 84 is, for example, silicon dioxide and supports the waveguide 80 by being in contact with a portion of the waveguide 80. In the present embodiment, a plurality of the supports 84 are provided at a distance from each other in the direction traveled by light in the waveguide 80 (transmission direction of light). In other words, the waveguide 80 is supported by the plurality of supports 84 provided at a distance from each other on the silicon substrate 85. The waveguide 80 may be provided directly on the silicon substrate 85, but when the waveguide 80 is supported by the support 84 as in the present embodiment, the majority of light transmitted by the waveguide 80 can be prevented from being transmitted to the silicon substrate 85. In an example of forming the waveguide 80 directly on the silicon substrate 85, germanium is used as the material of the waveguide 80. The refractive index of germanium (4.0) is greater than the refractive index of silicon (approximately 3.4), and light can propagate by total reflection through germanium. In other words, the materials of the substrate and waveguide (here, silicon and geranium) are not restricted to particular materials and may be selected freely as long as the refractive index of the waveguide is greater than that of the substrate.

An example of the height of the support 84 (the length in the z-axis direction) is 3 μm. An example of the height of the waveguide 80 (the length in the z-axis direction) is 0.3 μm. An example of the width of the waveguide 80 is 10 μm at the portion where the support 84 is present. An example of the width of the waveguide 80 is 4 μm at the portion where the support 84 is not present. Here, the width of the waveguide 80 is the length in a direction orthogonal to the transmission direction of light in the xy plane. In the example in FIG. 7, the width is the length in the x-axis direction. In the present embodiment, the waveguide 80 has a curved optical path in the xy plane. The width direction is therefore not limited to the x-axis direction and varies depending on the position of the waveguide 80.

Method of Producing Gas Detection Apparatus

The gas detection apparatus 100 according to the present embodiment can be produced by the following method. The laminated structure of the LED that is the light emitter 3 and of the photodiode that is the light receiver 4 is described first, and the method of producing the gas detection apparatus 100 is then described.

Hierarchical Structure of Light Emitter

Figure 8:
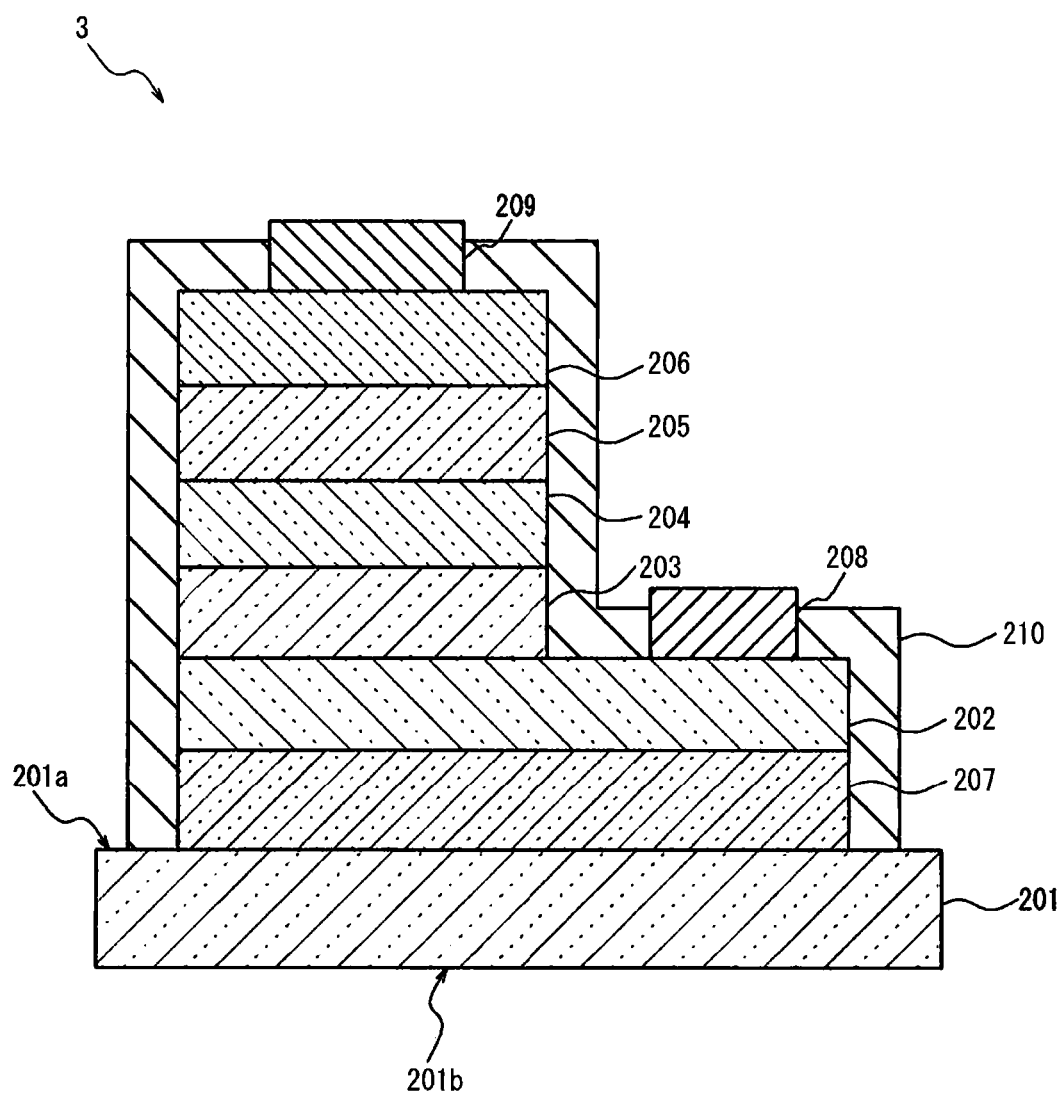
FIG. 8 illustrates an example hierarchical structure of a light emitter.

FIG. 8 illustrates an example of the hierarchical structure of the light emitter 3 (LED) of the gas detection apparatus 100 according to the present embodiment. As illustrated in FIG. 8, the light emitter 3 includes a substrate 201, a buffer layer 207, an n-type contact layer 202, an n-type barrier layer 203, an active layer 204, a p-type barrier layer 205, a p-type contact layer 206, an n-type electrode 208, a p-type electrode 209, and a passivation film 210. The buffer layer 207, the n-type contact layer 202, the n-type barrier layer 203, the active layer 204, the p-type barrier layer 205, and the p-type contact layer 206 are formed in this order on the substrate 201. In other words, a semiconductor laminate that includes the buffer layer 207, the n-type contact layer 202, the n-type barrier layer 203, the active layer 204, the p-type barrier layer 205, and the p-type contact layer 206 is formed on a principal surface 201a of the substrate 201. Here, the term "on" in the expression "the buffer layer 207 . . . is formed on the substrate 201" refers to how the buffer layer 207 is formed above the substrate 201. This expression also encompasses the case of another layer being present between the substrate 201 and the buffer layer 207. The term "on" as used to express the relationships between other layers carries the same meaning.

As illustrated in FIG. 8, the width of the buffer layer 207 and the n-type contact layer 202 is greater than the width of the n-type barrier layer 203, the active layer 204, the p-type barrier layer 205, and the p-type contact layer 206. In other words, a step is provided between the n-type contact layer 202 and the n-type barrier layer 203. The n-type electrode 208 is formed on the upper surface of the n-type contact layer 202 yielded by this step, and the p-type electrode 209 is formed on the upper surface of the p-type contact layer 206. The upper surface of the substrate 201 and the sides and upper surface of the semiconductor laminate are covered by the passivation film 210. The upper portions of the n-type electrode 208 and the p-type electrode 209 are exposed from the passivation film 210.

The substrate 201 includes GaAs. Here, the term "includes" in the expression "includes GaAs" refers to how GaAs is mainly included within the layer (within the substrate) but encompasses the case of other elements being included. The term "includes" in expressions of the composition of other layers carries the same meaning. The buffer layer 207 includes AlGaSb. The n-type contact layer 202 includes InAsSb that includes Si (n-type dopant). The n-type barrier layer 203 includes AlInAsSb that includes Si (n-type dopant). The active layer 204 includes $InAs_xSb_{(1-x)}$ ($0 \leq x \leq 1$). The p-type barrier layer 205 includes AlGaSb that includes Si (p-type dopant). The p-type contact layer 206 includes GaSb or GaInSb that includes Si (p-type dopant). The n-type electrode 208 includes Au/Ti. The p-type electrode 209 includes Au/Ti. The passivation film 210 includes silicon nitride.

The light emitter 3 is, for example, produced as follows. First, molecular beam epitaxy (MBE) is used to form the buffer layer 207, the n-type contact layer 202, the n-type barrier layer 203, the active layer 204, the p-type barrier layer 205, and the p-type contact layer 206 on a GaAs wafer (substrate 201).

Next, wet etching with acid, dry etching, ion milling, or the like is used to partially remove the n-type barrier layer 203, the active layer 204, the p-type barrier layer 205, and the p-type contact layer 206 to form a step for contact between the n-type contact layer 202 and the n-type electrode 208. By this process, a plurality of semiconductor laminates having a step are formed on the GaAs wafer.

Next, mesa etching is performed on the plurality of semiconductor laminates having a step to separate the devices (individual LEDs). The n-type contact layer 202 and the buffer layer 207 appearing at the bottom of the step are partially removed sequentially to expose the upper surface of the substrate 201 at a device separation region.

Next, the upper surface of the substrate 201 and the upper and side surfaces of the separated semiconductor laminate are covered by the passivation film 210, which includes silicon nitride.

Next, the portions of the passivation film 210 for forming the n-type electrode 208 and the p-type electrode 209 are etched to form through-holes. Au/Ti electrodes are then formed to fill the through-holes with a lift-off process or the like.

Hierarchical Structure of Light Receiver

Figure 9:
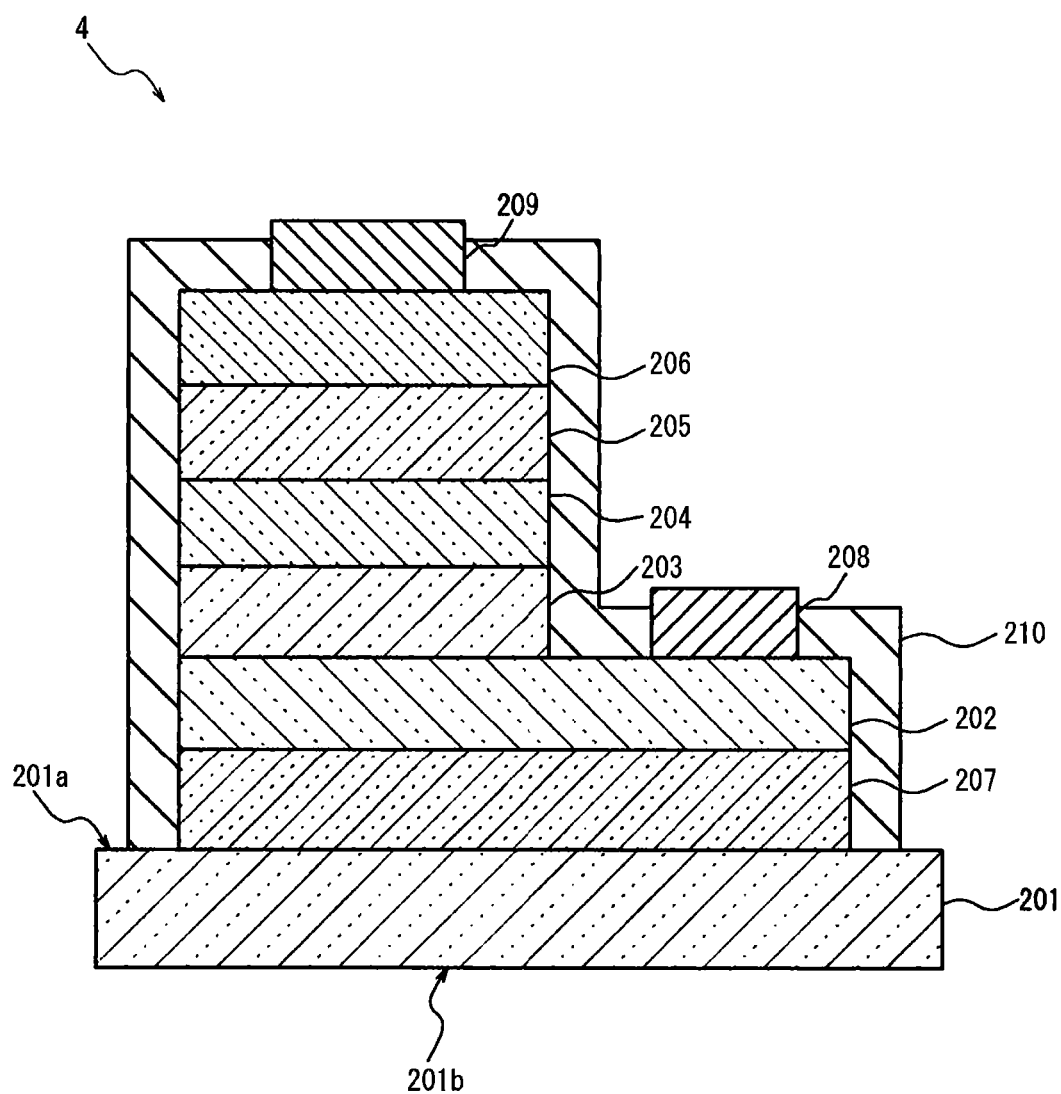
FIG. 9 illustrates an example hierarchical structure of a light receiver.

FIG. 9 illustrates an example of the hierarchical structure of the light receiver 4 (photodiode) of the gas detection apparatus 100 according to the present embodiment. As illustrated in FIG. 9, the light receiver 4 includes a substrate 201, a buffer layer 207, an n-type contact layer 202, an n-type barrier layer 203, an active layer 204, a p-type barrier layer 205, a p-type contact layer 206, an n-type electrode 208, a p-type electrode 209, and a passivation film 210. The buffer layer 207, the n-type contact layer 202, the n-type barrier layer 203, the active layer 204, the p-type barrier layer 205, and the p-type contact layer 206 are formed in this order on the substrate 201. In other words, a semiconductor laminate that includes the buffer layer 207, the n-type contact layer 202, the n-type barrier layer 203, the active layer 204, the p-type barrier layer 205, and the p-type contact layer 206 is formed on a principal surface 201a of the substrate 201.

As illustrated in FIG. 9, the width of the buffer layer 207 and the n-type contact layer 202 is greater than the width of the n-type barrier layer 203, the active layer 204, the p-type barrier layer 205, and the p-type contact layer 206. In other words, a step is provided between the n-type contact layer 202 and the n-type barrier layer 203. The n-type electrode 208 is formed on the upper surface of the n-type contact layer 202 yielded by this step, and the p-type electrode 209 is formed on the upper surface of the p-type contact layer 206. The upper surface of the substrate 201 and the sides and upper surface of the semiconductor laminate are covered by the passivation film 210. The upper portions of the n-type electrode 208 and the p-type electrode 209 are exposed from the passivation film 210.

The hierarchical structure of the light receiver 4 is thus the same as that of the light emitter 3. The substrate 201, the buffer layer 207, the n-type contact layer 202, the n-type barrier layer 203, the active layer 204, the p-type barrier layer 205, the p-type contact layer 206, the n-type electrode 208, the p-type electrode 209, and the passivation film 210 of the light receiver 4 are the same as the constituent elements of the light emitter 3 with the same name. For example, the buffer layer 207 of the light receiver 4 includes AlGaSb, like the light emitter 3. The light receiver 4 can be produced by the same method as the light emitter 3.

Figure 10:
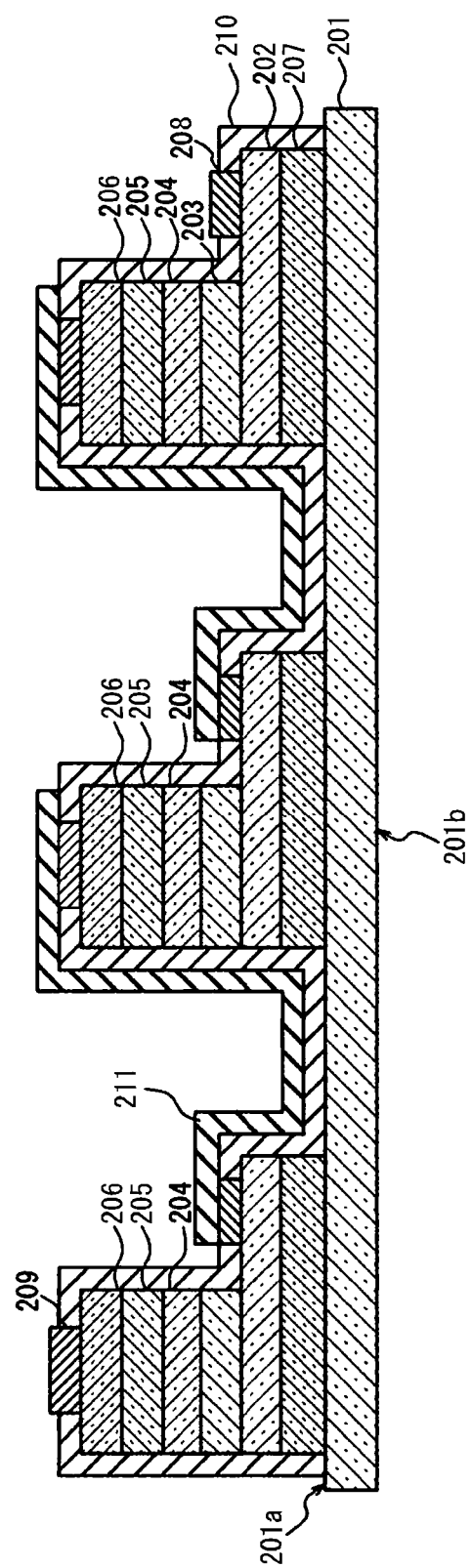
FIG. 10 illustrates a light receiver or a light emitter having a plurality of basic structures.

The light emitter 3 can be configured by combining a plurality of the basic structures of FIG. 8. The light receiver 4 can be configured by combining a plurality of the basic structures of FIG. 9. As illustrated in FIG. 10, the plurality of basic structures in the light emitter 3 or the light receiver 4 can be connected electrically to each other by provision of routing wires 211 that connect electrodes (the n-type electrode 208 and the p-type electrode 209). The electrical connection is a series connection in the example in FIG. 10 but may instead be a parallel connection.

Lead Frame

The lead frame 15 can be produced with a known technique. For example, the lead frame 15 can be formed by selectively etching the front and back surfaces of a copper (Cu) plate using photolithography and then plating with nickel (Ni)-palladium (Pd)-gold (Au) or the like. The lead frame 15 includes half-etched regions and non-etched regions. For example, the terminals 31 may be non-etched regions. The portions of the lead frame other than the terminals 31 may be formed as half-etched regions. The terminals 31 may be connected with a portion of the half-etched regions.

Production of First Layer

As described above, the first layer 1 is configured so that the light emitter 3, the light receiver 4, the controller 5, and the lead frame 15 are sealed by a resin such as epoxy, for example. An adhesive sheet 51 is used in producing the first layer 1. Resin tape that has both adhesiveness and heat resistance is used as the adhesive sheet 51. The adhesiveness is preferably achieved by a thinner adhesive layer. The heat resistance is preferably up to temperatures of approximately 150° C. to 200° C. Polyimide tape that is heat resistant to approximately 280° C., for example, can be used as the adhesive sheet 51. Polyester tape, Teflon® (Teflon is a registered trademark in Japan, other countries, or both) tape, polyphenylene sulfide (PPS), glass cloth, Nomex paper, or the like can also be used as the adhesive sheet 51.

FIG. 11 illustrates an example cross-section of the first layer 1 during the production process. An adhesive layer of the adhesive sheet 51 is attached to the back surface (the surface where wire bonding is not performed) of the lead frame 15 that includes the terminals 31. Next, the light emitter 3, the light receiver 4, and the controller 5 are disposed inside an opening that passes through the lead frame 15. In the present embodiment, the first layer 1 differs from the second layer 2 by not including a semiconductor substrate. The light emitter 3, the light receiver 4, and the controller 5, however, are aligned on the flat surface of the adhesive sheet 51 attached to the back surface of the lead frame 15.

In the present embodiment, a surface 201b (back surface) that is opposite the principal surface 201a of the substrate 201 (see FIG. 8 and FIG. 9) of the light emitter 3 and the light receiver 4 is attached to the adhesive layer of the adhesive sheet 51. The surface (back surface) of the controller 5 opposite the surface that includes particular terminals for connection with the light emitter 3, the light receiver 4, and the lead frame 15 is attached to the adhesive layer of the adhesive sheet 51. Next, the light emitter 3, the light receiver 4, the controller 5, and the lead frame 15 are electrically connected by wire bonding or the like. Next, the light emitter 3, the light receiver 4, the controller 5, and the lead frame 15 are sealed by a mold member 52. The adhesive sheet 51 is peeled off after the mold member 52 hardens, thereby forming the first layer 1. At this time, the surfaces 201b (back surfaces) of the light emitter 3 and the light receiver 4 are exposed from the resin mold member 52. The back surface of the light emitter 3 is opposite the light input unit 81 of the second layer 2 in the gas detection apparatus 100 according to the present embodiment. The back surface of the light receiver 4 is opposite the light output unit 82 of the second layer 2. The surface (back surface) of the controller 5 opposite the surface that includes particular terminals is exposed from the resin mold member 52.

The material of the mold member 52 is, for example, selected to include epoxy-based thermosetting resin and to resist high temperatures during reflow. The mold member 52 may, for example, be shaped as a cuboid. An example of the size of the mold member 52 is a length of 5.2 mm in the x-axis direction, a length of 6.5 mm in the y-axis direction, and a length of 0.4 mm in the z-axis direction.

Production of Second Layer

As described above, the supports 84 and the waveguide 80 are formed on the silicon substrate 85 of the second layer 2. In the second layer 2, a silicon dioxide layer and a silicon layer are formed in this order on a Si wafer (silicon substrate 85). A portion of the silicon substrate 85 is then removed by etching or the like to form the supports 84 and the waveguide 80. An example of the size of the second layer 2 is a length of 4.3 mm in the x-axis direction, a length of 6.3 mm in the y-axis direction, and a length of 0.3 mm in the z-axis direction.

Attachment Process

The first layer 1 and the second layer 2 are devices that have been separated by dicing. As described above, the second layer 2 is connected to the first layer 1 by the attachment portion 71 in each device. In the present embodiment, the attachment portion 71 is configured by hardened adhesive that includes particles. Here, the interval between the first layer 1 and the second layer 2 is a predetermined value or more, and the predetermined value can be calculated as $A-2\sigma$ using the average A of the particle size and the standard deviation $\sigma$. For example, $A-2\sigma$ is 36 μm when the average A is 40 μm and the standard deviation $\sigma$ is 2 μm.

As described above, the gas detection apparatus 100 according to the present embodiment includes the first layer 1, which contains the light emitter 3 and the light receiver 4, and the second layer 2, which contains the light input unit 81 and the light output unit 82 of the waveguide 80. The first layer 1 and the second layer 2 are attached in the gas detection apparatus 100 so that the light emitter 3 and the light input unit 81 are close to and opposite each other, and so that the light receiver 4 and the light output unit 82 are close to and opposite each other. At this time, no optical components are disposed between the light source and the waveguide 80 in the gas detection apparatus 100. The gas detection apparatus 100 according to the present embodiment allows greater miniaturization than a conventional technique.

Modification to First Embodiment

In the example in FIG. 2, the controller 5 is disposed on an island included in the lead frame 15. The island is a dedicated region provided for mounting an integrated circuit (IC) such as the controller 5. However, the controller 5 may be sealed by resin, like the light emitter 3 and the light receiver 4, without the inclusion of an island.

Figure 12:
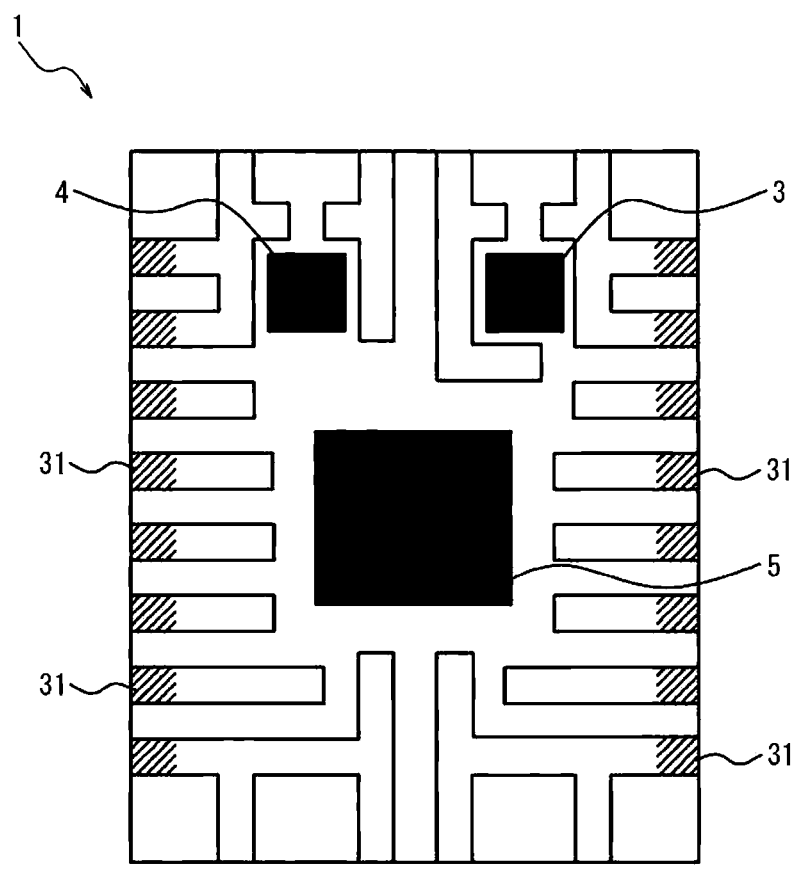
FIG. 12 illustrates an example configuration of an island-less first layer.

FIG. 12 illustrates an example configuration of the first layer 1 for the case of the lead frame 15 not including an island (i.e. being island-less). In general, a certain interval is required between conducting portions of a lead frame. For example, when a 0.4 mm thick lead frame is etched, the constant interval is 0.32 mm or more. Accordingly, the aforementioned interval is necessary around the island when the island is included. The island-less first layer 1 does not require such an interval and can therefore be further miniaturized in the xy directions. The island-less first layer 1 also does not require the connecting portion provided to support the island. The shape of the lead frame can therefore be further simplified, which facilitates processing. The thickness of the island formed by etching (such as 0.1 mm) is absent from the island-less first layer 1. This facilitates the electrical connection of the light emitter 3, the light receiver 4, the controller 5, and the lead frame 15 by wire bonding or the like, since the space above the controller 5 widens by 0.1 mm, for example. As another example, the chip thickness of the controller 5 may be increased in the island-less first layer 1 by the thickness an island would have occupied (such as 0.1 mm), thereby increasing the robustness without changing the overall thickness.

The optical filter is not limited in number or position and may, for example, be placed anywhere on the optical path.

The gas detection apparatus 100 may be configured so that at least one of the light emitter 3, the waveguide 80, and the light receiver 4 includes an optical filter. No limit is placed on the number of optical filters.

Figure 13:
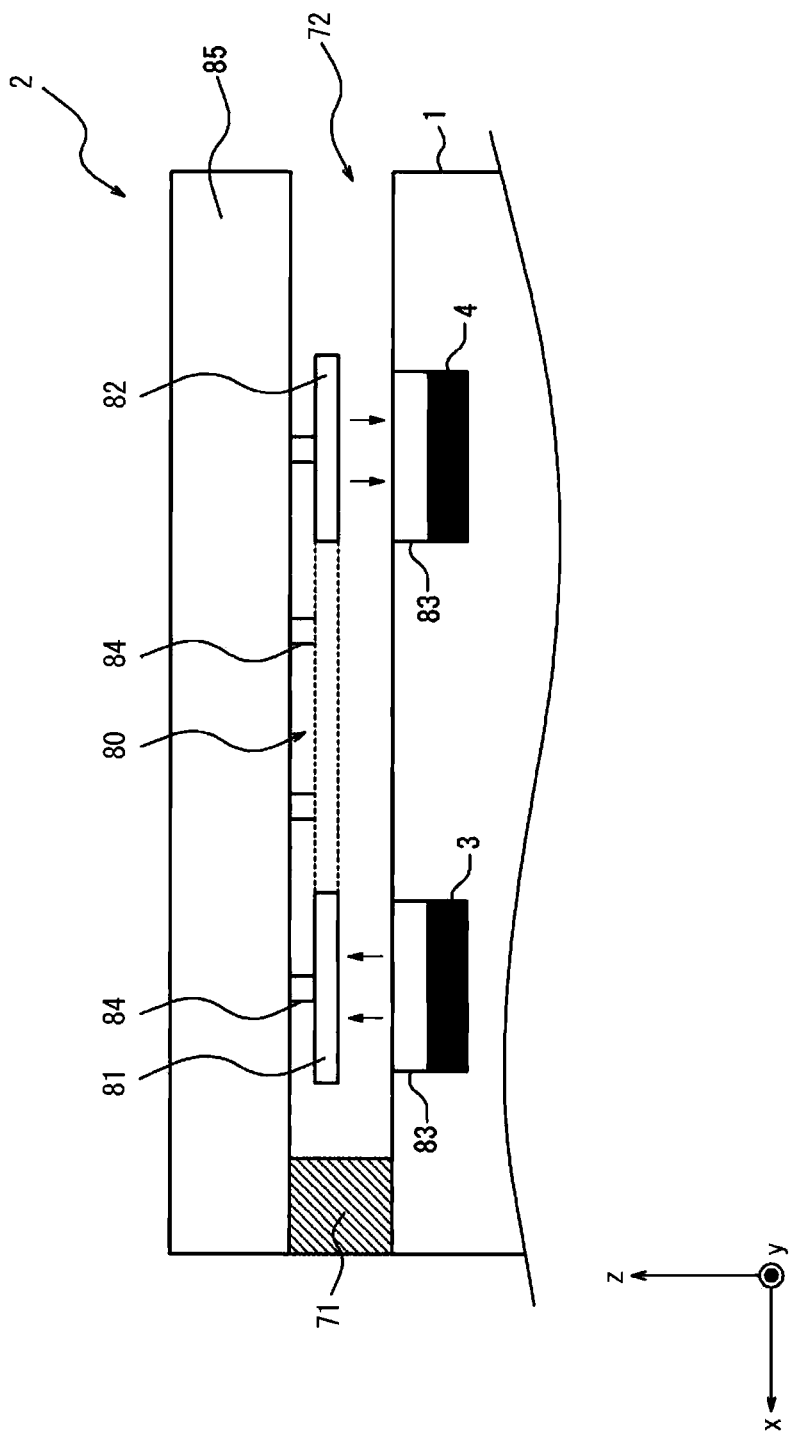
FIG. 13 illustrates an optical filter.
Figure 14:
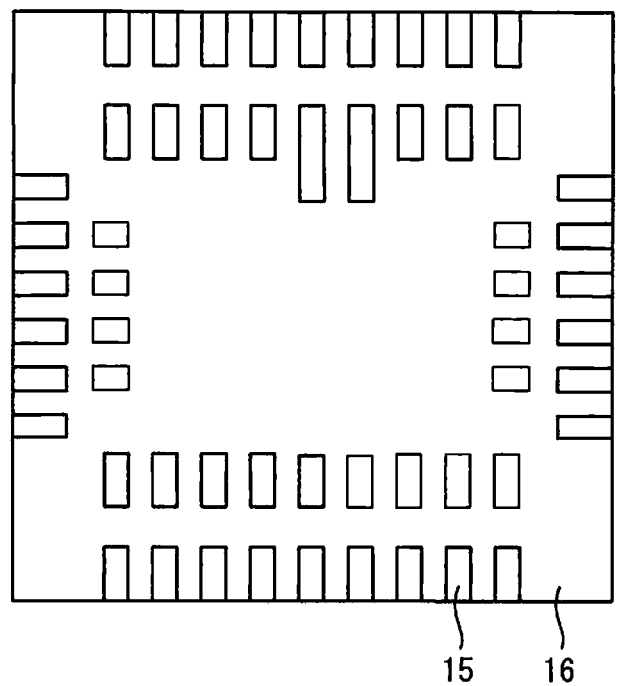
FIG. 14 is an external view (bottom view) illustrating an example gas detection apparatus according to a second embodiment of the present disclosure.

An optical filter may be provided on the surface of at least one of the light emitter 3 and the light receiver 4 on the optical waveguide 80 side. In other words, an optical filter may be provided between the light emitter 3 and the light input unit 81 and/or provided between the light output unit 82 and the light receiver 4. As illustrated in FIG. 13, for example, a chip-shaped optical filter (optical filter chip) may be attached to the back surface of at least one of the light emitter 3 and the light receiver 4 of the first layer 1. The optical filter chip is preferably the same size as the light emitter 3 or the light receiver 4 to which the optical filter chip is attached. An optical filter film may be formed on the back surface of at least one of the light emitter 3 and the light receiver 4. When the gas detection apparatus 100 includes an optical filter on at least one of the light emitter 3 and the light receiver 4, the optical filter 83 of the waveguide 80 may be omitted. The waveguide 80 may therefore have a simple structure without the optical filter 83, which facilitates production of the gas detection apparatus 100.

Instead of the waveguide 80, a gas cell may be used. Light may enter and be received directly in a gas cell, thereby allowing greater miniaturization than an apparatus using a conventional gas cell.

In the example in FIG. 4, adhesive is applied in a line on the surface of the first layer 1 where the adhesive sheet 51 is attached, i.e. the back surface of the lead frame 15, so that the attachment portion 71 is provided in a line along the long sides (in the y-axis direction) of the left and right edges of the second layer 2. In other words, the adhesive is applied continuously in a line along the long sides. The adhesive may be applied at intervals instead of being applied continuously. For example, the adhesive may be applied at the four corners of the second layer 2. At this time, the vent 72 may also be provided at the portion where the adhesive is not applied to increase the area of the vent 72.

Second Embodiment

Configuration of Gas Detection Apparatus

Figure 15:
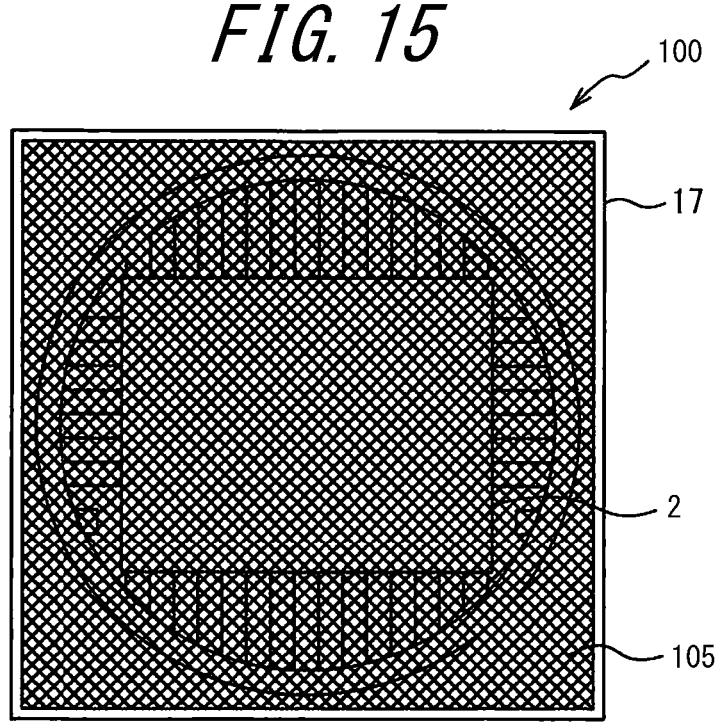
FIG. 15 is an external view (top view) illustrating an example gas detection apparatus according to the second embodiment of the present disclosure.
Figure 16:
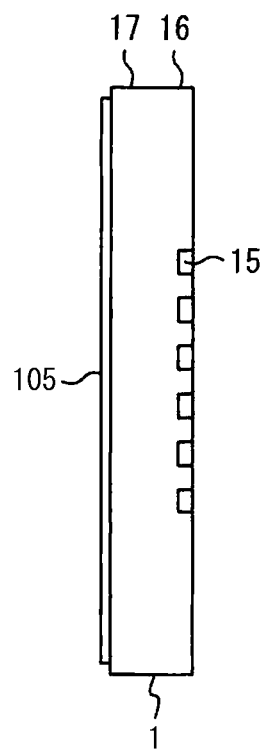
FIG. 16 is an external view (side view) illustrating an example gas detection apparatus according to the second embodiment of the present disclosure.
Figure 17:
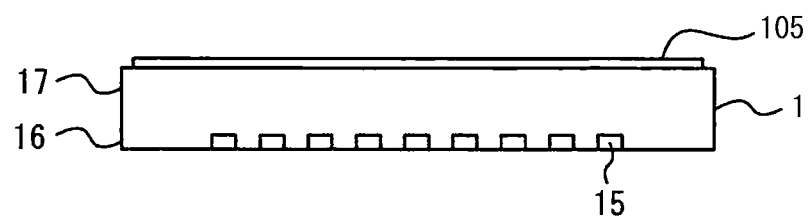
FIG. 17 is an external view (front view) illustrating an example gas detection apparatus according to the second embodiment of the present disclosure.
Figure 18:
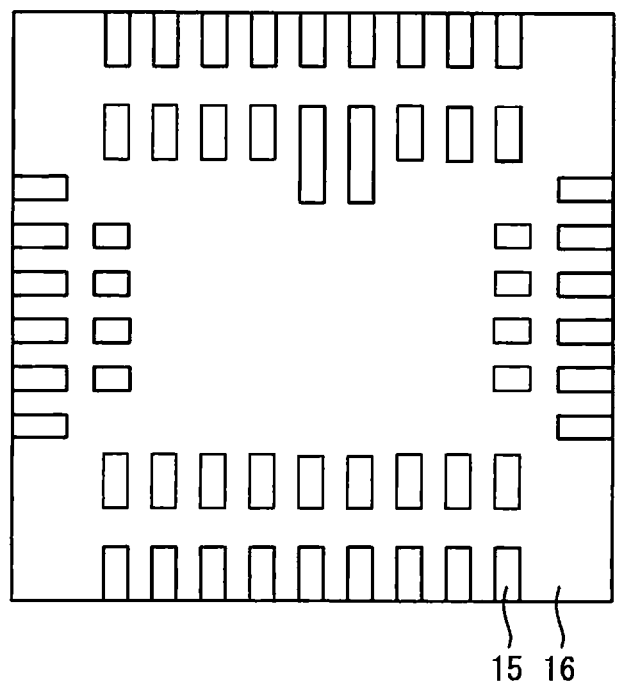
FIG. 18 is a view (bottom view) of the gas detection apparatus illustrated in FIGS. 14 through 17 with a non-woven fabric removed.
Figure 19:
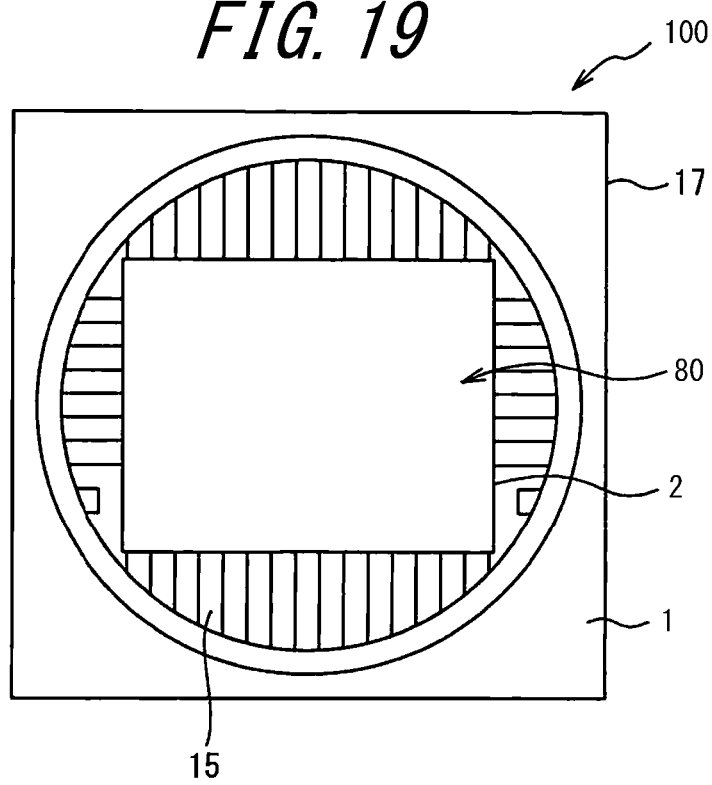
FIG. 19 is a view (top view) of the gas detection apparatus illustrated in FIGS. 14 through 17 with the non-woven fabric removed.
Figure 20:
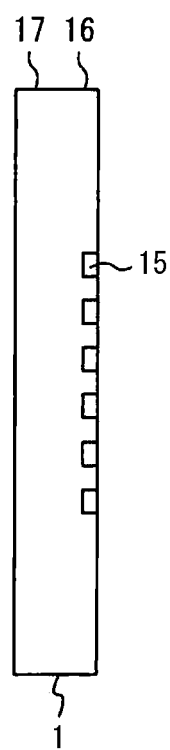
FIG. 20 is a view (side view) of the gas detection apparatus illustrated in FIGS. 14 through 17 with the non-woven fabric removed.
Figure 21:
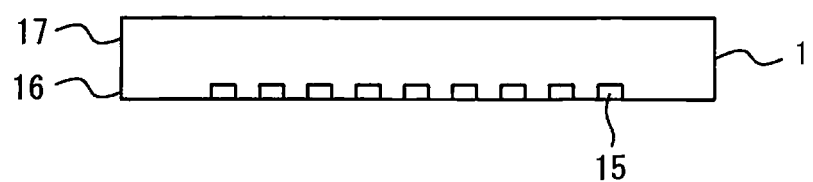
FIG. 21 is a view (front view) of the gas detection apparatus illustrated in FIGS. 14 through 17 with the non-woven fabric removed.
Figure 22:
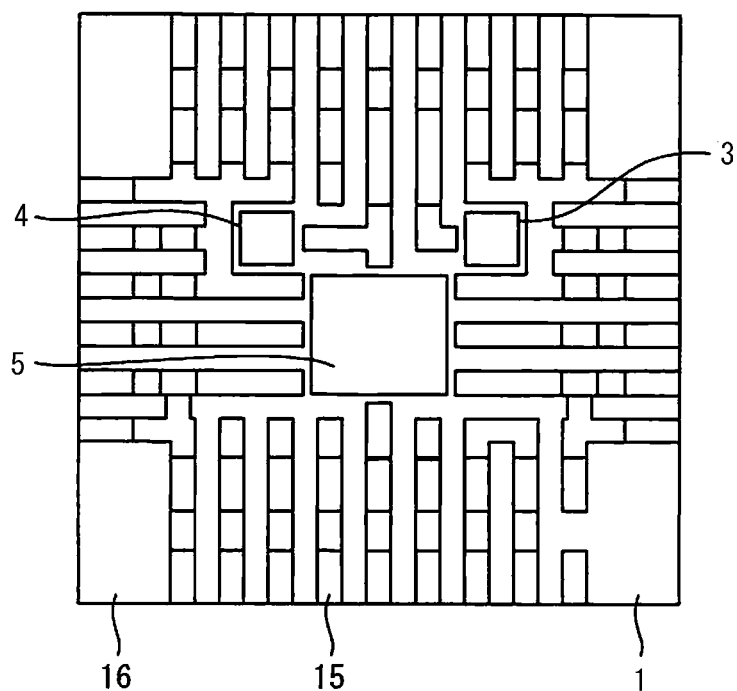
FIG. 22 is a perspective view (bottom view) of the gas detection apparatus illustrated in FIGS. 14 through 17.
Figure 23:
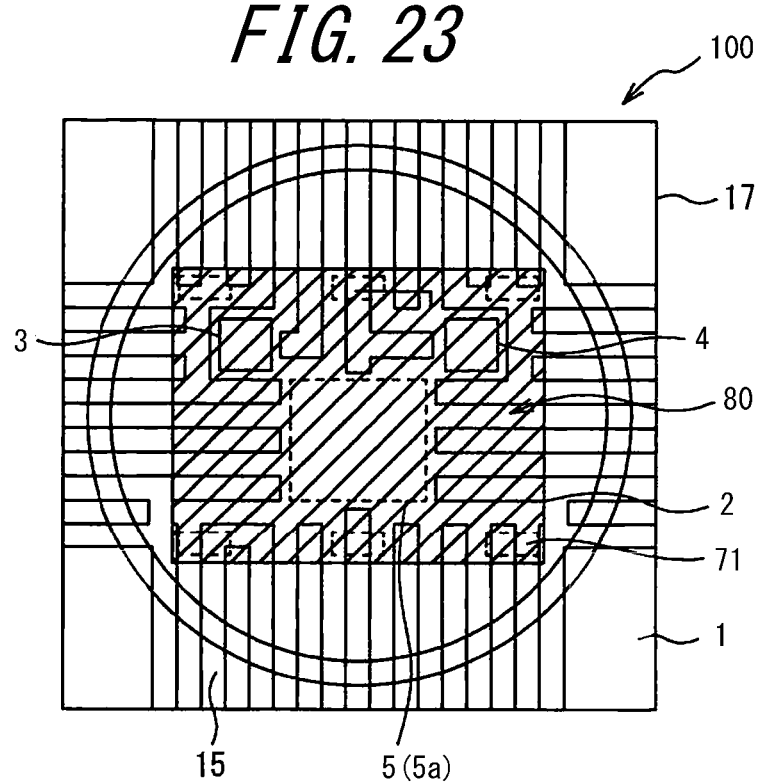
FIG. 23 is a perspective view (top view) of the gas detection apparatus illustrated in FIGS. 14 through 17.
Figure 24:
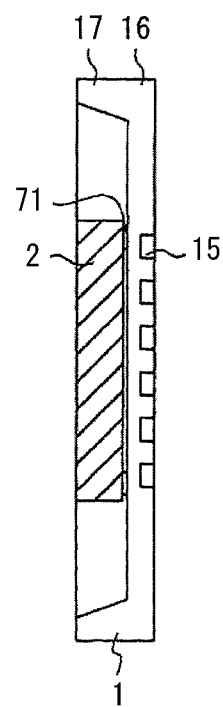
FIG. 24 is a perspective view (side view) of the gas detection apparatus illustrated in FIGS. 14 through 17.
Figure 25:
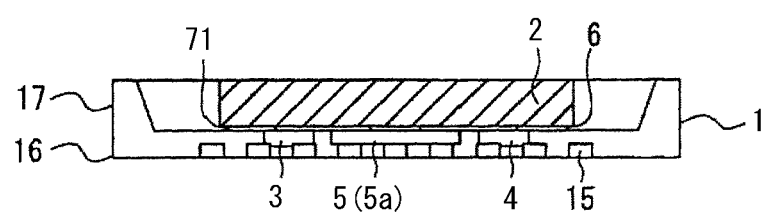
FIG. 25 is a perspective view (front view) of the gas detection apparatus illustrated in FIGS. 14 through 17.

FIGS. 14 to 25 are schematic diagrams illustrating an example of a gas detection apparatus 100 according to a second embodiment of the present disclosure. FIGS. 14 to 17 are external views that include a non-woven fabric 105, described below. FIGS. 18 to 21 are external views corresponding to FIGS. 14 to 17 without the non-woven fabric 105. FIGS. 22 to 25 are perspective views corresponding to FIGS. 18 to 21. Among FIGS. 14 to 25, FIGS. 14, 18, and 22 are bottom views, FIGS. 15, 19, and 23 are top views, FIGS. 16, 20, and 24 are side views, and FIGS. 17, 21, and 25 are front views.

As illustrated in FIGS. 22 to 25, the gas detection apparatus 100 includes a first layer 1, a second layer 2, and a wall 17 provided on the first layer 1. The second layer 2 is disposed in a region of the first layer 1 surrounded by the wall 17. The first layer 1 and the second layer 2 are connected via an attachment portion 71. As illustrated in FIGS. 14 to 17, a non-woven fabric 105 is provided to cover the upper surface of the first layer 1 and the upper surface of the second layer 2. The second layer 2 is substantially rectangular in a top view. The attachment portion 71 is, for example, provided discontinuously on a pair of two opposite sides of the second layer 2 in a top view. In FIGS. 22 to 25, the attachment portion 71 is provided at three locations on each of the opposite upper and lower sides, for a total of six locations.

The attachment portion 71 may, for example, be formed by particle-containing resin. The first layer 1 and the second layer 2 are connected via this particle-containing attachment portion 71, thereby forming a gap between the first layer 1 and the second layer 2. The gap formed between the first layer 1 and the second layer 2 becomes a flow path 6 that communicates with a waveguide 80. The gas detection apparatus 100 is placed in a measurement environment and detects the concentration of a gas that passes through the flow path 6. The first layer 1, the second layer 2, and the attachment portion 71 may, for example, be configured to include light-blocking resin or metal, so that light from around the gas detection apparatus 100 does not reach a light input unit 81 and a light receiver 4.

Configuration of First Layer

The first layer 1 includes a light emitter 3 that emits light, the light receiver 4 for receiving light that passes through the waveguide 80, and a controller 5 that controls at least one of the light emitter 3 and the light receiver 4. The light emitter 3, the light receiver 4, and the controller 5 are connected electrically to a lead frame 15, which includes lead terminals and an island, by wire bonding with non-illustrated wires 14, for example. The first layer 1 is configured by sealing the light emitter 3, the light receiver 4, the controller 5, the wires 14, and the lead frame 15 with a sealing portion 16 made of an epoxy resin, for example. The sealing portion 16 is substantially square in a top view. The light emitter 3 and the light receiver 4 are sealed so that the light emitting surface of the light emitter 3 and the light receiving surface of the light receiver 4 are exposed from one surface of the sealing portion 16.

The light emitter 3 and the light receiver 4 need not be provided so that the light emitting surface of the light emitter 3 and the light receiving surface of the light receiver 4 are coplanar. It suffices for the light emitter 3 and the light receiver 4 to be provided on the same surface of the sealing portion 16 and to face the same direction. If the light emitting surface of the light emitter 3 and the light receiving surface of the light receiver 4 face the same direction, the light emitting surface and the light receiving surface may, for example, be disposed in different planes. The light emitter 3 is configured to include a light emitting diode (LED), for example. The light emitter 3 is not limited to being an LED and may, for example, be a semiconductor laser, an organic light emitting element, or the like.

The light receiver 4 is configured to include a photodiode, for example. The light receiver 4 is a sensor device that receives light, converts the received light into an electrical signal, and outputs the converted electrical signal to the controller 5. The light receiver 4 is not limited to being a photodiode and may be a phototransistor or the like. The controller 5 is, for example, a processor that includes an LED driver. The light that the light emitter 3 emits and the light receiver 4 receives is infrared light. The gas to be detected by the gas detection apparatus 100 is, for example, carbon dioxide. The wavelength band of the infrared light that the light emitter 3 emits and the light receiver 4 receives includes the 4.3 μm band and overlaps with the absorption wavelength band of carbon dioxide. The light emitter 3 is not limited to emitting only infrared light and may emit infrared light and light with a different wavelength from infrared light. Alternatively, the light emitter 3 may emit visible light or light other than infrared light.

It is known that many specific absorption bands exist for each type of gas in an infrared wavelength range of 2.5 µm to 6.0 µm. The gas detection apparatus 100 can be used to detect not only carbon dioxide but also other gases. Examples of the other gases include water, methane, formaldehyde, carbon monoxide, nitric oxide, ammonium, sulfur dioxide, and alcohol. Examples of alcohol gases may include not only pure ethanol but also an alcohol component, such as ethanol, included in the breath of a person who has imbibed alcohol. For example, methane can be detected in the gas detection apparatus 100 by the use of infrared light in a 3.3 µm wavelength band that overlaps with the absorption wavelength band of methane.

Configuration of Second Layer

Figure 26:
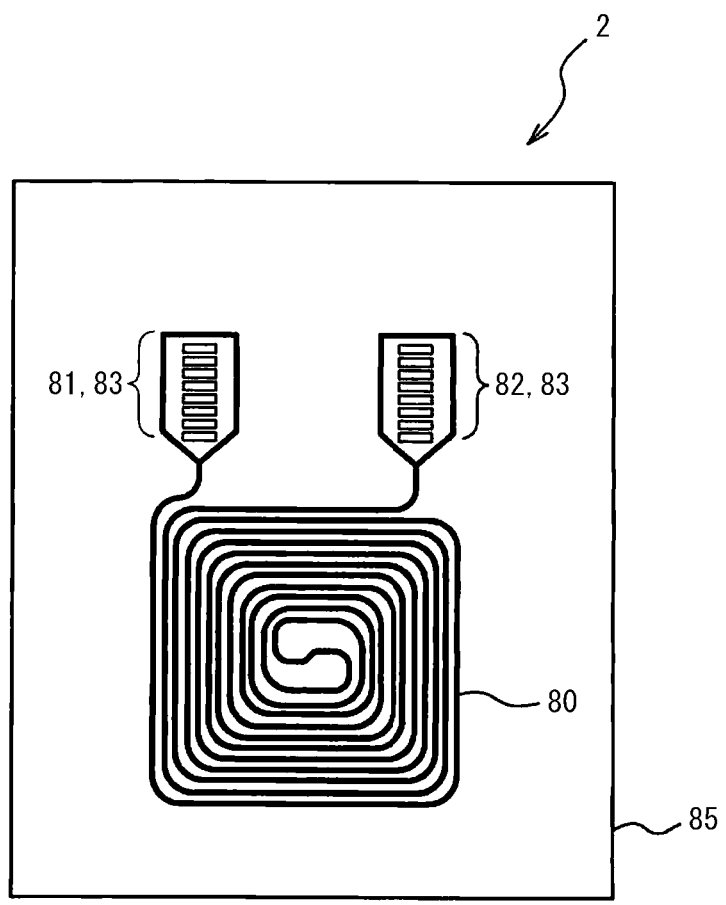
FIG. 26 is a top view illustrating an example second layer.

FIG. 26 illustrates an example configuration of the second layer 2. The second layer 2 includes a silicon substrate 85 and the waveguide 80. The waveguide 80 includes the light input unit 81, into which light emitted by the light emitter 3 is inputted, and a light output unit 82, from which light that has passed through the waveguide 80 is outputted to the light receiver 4. The light input unit 81 and the light output unit 82 may be positioned at an edge of the waveguide 80 or positioned at a location away from the edge.

An optical filter 83 is provided in the section from the light input unit 81 to the light output unit 82. For example, the waveguide 80 may include two optical filters 83 to be in contact with the light input unit 81 and the light output unit 82. The optical filter 83 may, for example, have the function of transmitting only infrared light. The optical filter 83 may, for example, be a lattice filter that has a lattice structure. The structure and type of the optical filter 83 are not, however, limited to these examples. The light input unit 81 and the light output unit 82 may be a grating coupler that has a lattice structure. The optical filter 83 and the light input unit 81, or the optical filter 83 and the light output unit 82, may share the same lattice structure. A single optical filter 83 may be provided, or the optical filter 83 may be omitted. Two or more optical filters 83 may also be provided. As another configuration example, the waveguide 80 may include an optical filter at a position not in contact with, i.e. separated from, the light input unit 81 or the light output unit 82. For example, a ring resonator or a Bragg grating may be inserted in the section from the light input unit 81 to the light output unit 82 as an optical filter. A chip-shaped optical filter may be attached to either or both of the light receiver 4 and the light emitter 3 of the first layer 1. Furthermore, as another configuration example, an optical filter film may be formed on the back surface of either or both of the light receiver 4 and the light emitter 3 as an optical filter.

The waveguide 80 transmits light received from the light input unit 81 to the light output unit 82. At least a portion of the light received by the light input unit 81 passes through the waveguide 80 and is transmitted to the light output unit 82. When light passes through the waveguide 80, an evanescent wave extends from the front and back surfaces and the side surfaces of the waveguide 80. The absorption rate of the evanescent wave changes in accordance with the concentration of the gas that enters through the flow path 6. Accordingly, the concentration of the gas can be detected by measuring the intensity of light outputted from the light output unit 82. In other words, the gas detection apparatus 100 can detect the concentration of a gas based on the amount of light received by the light receiver 4. For highly sensitive detection of a low-concentration gas, the length of the waveguide 80 through which light passes, i.e. the optical path length, is preferably maximized. As illustrated in FIG. 26, the provision of a curved optical path on one surface of the silicon substrate 85 in the gas detection apparatus 100 according to the present embodiment ensures the optical path length while avoiding an increase in size. The gas detection apparatus 100 may be provided with a multilayer optical path to further lengthen the optical path.

Attachment Portion

The first layer 1 and the second layer 2 are connected by an attachment portion 71 so that the light input unit 81 is opposite the light emitting surface of the light emitter 3, and the light output unit 82 is opposite the light receiving surface of the light receiver 4. Furthermore, the first layer 1 and the second layer 2 are connected so that the waveguide 80, excluding the light input unit 81 and the light output unit 82, is opposite an IC chip that includes the controller 5 (IC chip 5a). The attachment portion 71 is formed by an epoxy adhesive, for example. The adhesive includes particles having a size of a predetermined value or greater. Here, the "size" refers to the diameter of a spherical particle. An example of the predetermined value is 40 µm. The particles are, for example, made of hard resin. Even before the adhesive hardens, an interval of at least the predetermined value is ensured between the first layer 1 and the second layer 2. The flow path 6 having a predetermined gap can therefore be provided between the first layer 1 and the second layer 2. It suffices for the diameter (predetermined value) of the particles to be a value that ensures a distance such that the first layer 1 does not touch the waveguide 80. When, for example, the height of the support 84 is 3 µm and the height of the waveguide 80 is 0.3 µm, it suffices for the predetermined value to be greater than the sum of the height of the support 84 and the height of the waveguide 80. In other words, it suffices for the predetermined value to be greater than 3.3 µm. As another example, the predetermined value may be calculated by another statistical method (such as the average A or the standard deviation σ) instead of by the smallest particle size. For example, the predetermined value may be calculated as "(average A)−2×(standard deviation σ)". A−2σ is 36 µm, for example, when the average A is 40 µm and the standard deviation σ is 2 µm.

The light emitter 3 and the light input unit 81 are preferably close enough to each other for light emitted from the light emitter 3 to be sufficiently inputted into the light input unit 81. The light receiver 4 and the light output unit 82 are preferably close enough to each other for the light receiver 4 to be sufficiently capable of detecting the light outputted from the light output unit 82. Therefore, the particle diameter is preferably the minimum value in the appropriate range of the gap of the flow path 6.

Figure 27:
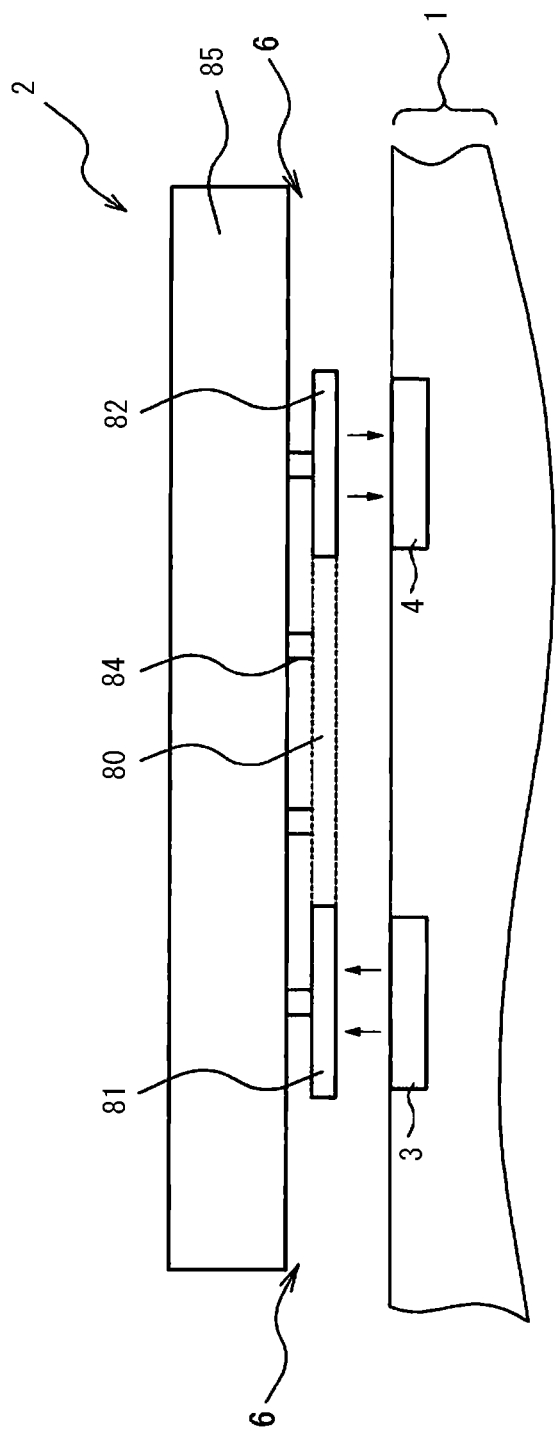
FIG. 27 is a schematic cross-section of an opposing first layer and second layer.

FIG. 27 is a schematic cross-section of the opposing first layer 1 and second layer 2. The attachment portion 71 is omitted from FIG. 27. As illustrated in FIG. 27, the supports 84 are formed on the second layer 2 between the silicon substrate 85 and the waveguide 80 at freely chosen intervals. An evanescent wave extends from the front and back surfaces and the side surfaces of the waveguide 80. When the waveguide 80 is suspended at a greater distance in the air, the length over which the evanescent wave extends can be increased efficiently. This allows highly sensitive detection of a low-concentration gas. Supports need to be provided at freely chosen intervals to suspend the waveguide 80 in the air. Furthermore, the supports 84 need to have a height such that the evanescent wave is not absorbed by the silicon substrate 85. To suppress the attenuation of light, the distance between the light emitter 3 and the light input unit 81 and between the light receiver 4 and the light output unit 82 is preferably further reduced, but this distance cannot approach the height of the waveguide 80 including the support 84.

Figure 28:
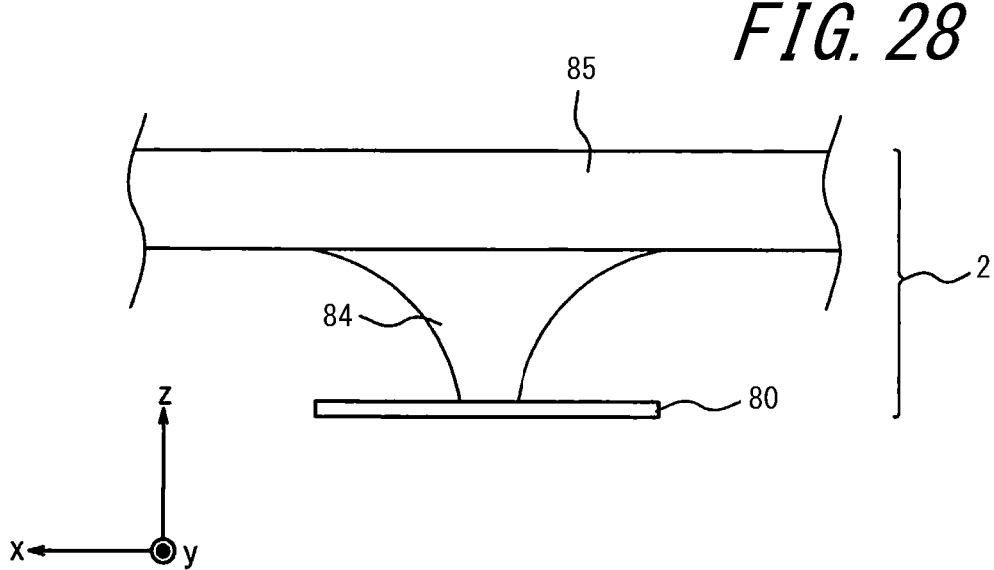
FIG. 28 illustrates an example configuration of a support.

FIG. 28 illustrates an example configuration of the support 84. The support 84 is, for example, formed by silicon dioxide and supports the waveguide 80 by being in contact with a portion of the waveguide 80. A plurality of the supports 84 are provided at a distance from each other in the transmission direction of light through the waveguide 80. In other words, the waveguide 80 is supported by the plurality of supports 84 provided at a distance from each other on the silicon substrate 85. The waveguide 80 may be provided directly on the silicon substrate 85, but when the waveguide 80 is supported by the supports 84, the majority of light transmitted by the waveguide 80 can be prevented from being transmitted to the silicon substrate 85. In an example of forming the waveguide 80 directly on the silicon substrate 85, germanium is used as the material of the waveguide 80. The refractive index of germanium (4.0) is greater than the refractive index of silicon (approximately 3.4), and light can propagate by total reflection through germanium. In other words, the materials of the substrate and waveguide (here, silicon and geranium) are not restricted to particular materials and may be selected freely as long as the refractive index of the waveguide is greater than that of the substrate.

An example of the height of the support 84 is 3 µm. An example of the height of the waveguide 80 is 0.3 µm. An example of the width of the waveguide 80 is 10 µm at the portion where the support 84 is present. An example of the width of the waveguide 80 is 4 µm at the portion where the support 84 is not present. Here, the width of the waveguide 80 is the length in a direction orthogonal to the transmission direction of light along one side of the silicon substrate 85. The width is the length in the x-axis direction in FIG. 28. The waveguide 80 has a curved optical path in the xy plane illustrated in FIG. 28. The width direction is therefore not limited to the x-axis direction in FIG. 28 and varies depending on the position of the waveguide 80.

Configuration of Wall

The wall 17 is disposed on the surface of the sealing portion 16 on the side of the light emitting surface of the light emitter 3 and the light receiving surface of the light receiver 4 so as to surround at least the second layer 2 in a top view. For example, the wall 17 is disposed to surround the second layer 2 circularly in a top view. The wall 17 is formed to be tapered, so that the inner diameter of the wall 17 increases towards the tip, and is formed so that the tip surface of the wall 17 is flush with the upper surface of the second layer 2 (the difference in height being 0.5 µm or less).

Figure 33:
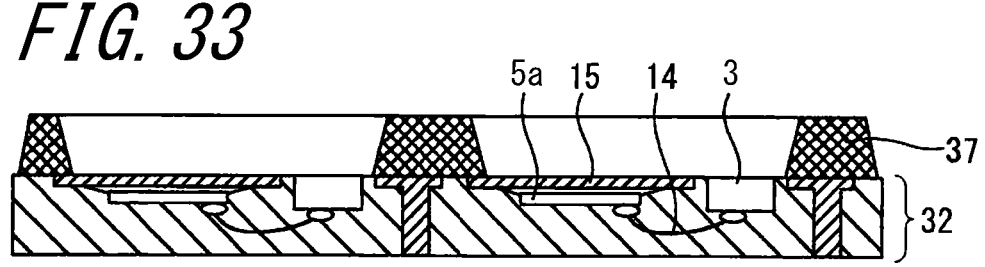
FIG. 33 is a cross-sectional diagram illustrating the schematic process of the method of producing the first layer.

As described below with reference to FIG. 33, the wall 17 is formed by splitting a resin layer 37 that becomes the wall 17 of two adjacent gas detection apparatuses. The resin layer 37 is conical in a side view, and splitting the resin layer 37 yields the wall 17 that is a quadrangular prism on the outside and that has a circular recess formed on the inside in a top view.

The wall 17 need not be provided to surround the entire second layer 2 and may instead surround only a portion of the second layer 2. For example, the wall 17 may be omitted from a portion around the second layer 2.

The tip surface of the wall 17 and the upper surface of the second layer 2 need not be flush and may be slightly misaligned. In a side view, the tip surface of the wall 17 may be higher than the upper surface of the second layer 2. In sum, it suffices for the non-woven fabric 105 to be attachable so that dust or the like does not enter through the gap between the first layer 1 and the second layer 2. The case of providing the wall 17 to surround the second layer 2 in a circular fashion in a top view has been described. Alternatively, the wall 17 may be disposed to surround the second layer 2 in a rectangular fashion in a top view, for example. In other words, the wall 17 may have any shape that can surround the outside of the second layer 2 in a top view.

Method of Producing Gas Detection Apparatus

The gas detection apparatus 100 can be produced by the following method. The laminated structure of the LED that is the light emitter 3 and of the photodiode that is the light receiver 4 is described first.

Hierarchical Structure of Light Emitter

Figure 29:
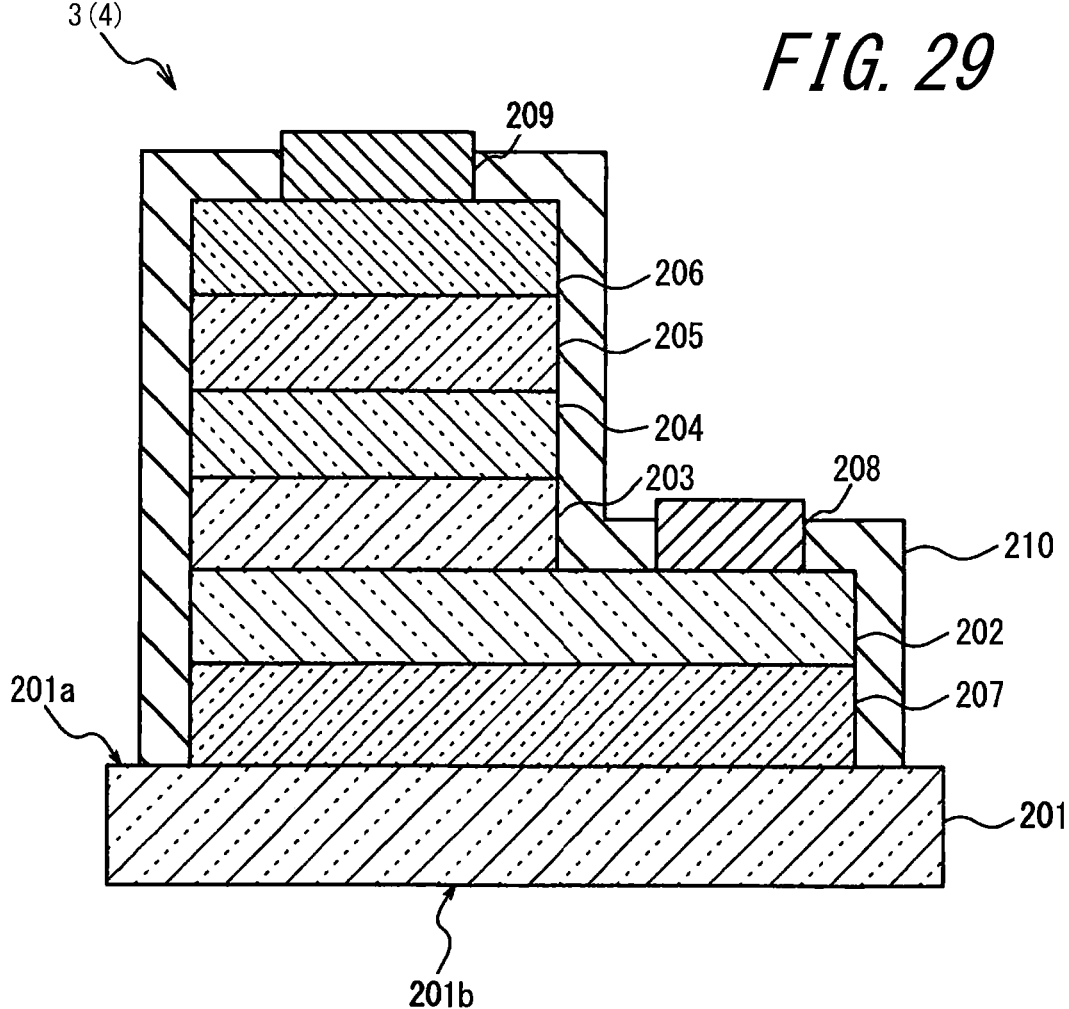
FIG. 29 is a cross-sectional view illustrating an example hierarchical structure of a light emitter.

FIG. 29 is a cross-sectional view illustrating an example hierarchical structure of the light emitter (LED) 3 of the gas detection apparatus 100. As illustrated in FIG. 29, the light emitter 3 includes a substrate 201, a buffer layer 207, an n-type contact layer 202, an n-type barrier layer 203, an active layer 204, a p-type barrier layer 205, a p-type contact layer 206, an n-type electrode 208, a p-type electrode 209, and a passivation film 210. In other words, a semiconductor laminate that includes the buffer layer 207, the n-type contact layer 202, the n-type barrier layer 203, the active layer 204, the p-type barrier layer 205, and the p-type contact layer 206 laminated in this order is formed on a principal surface 201*a* of the substrate 201.

Here, the term "on the substrate 201" refers to how the buffer layer 207 is formed directly above the substrate 201. However, this expression also encompasses the case of another layer being present between the substrate 201 and the buffer layer 207. The term "on" as used to express the relationships between other layers carries the same meaning. As illustrated in FIG. 29, the width of the buffer layer 207 and the n-type contact layer 202 is greater than the width of the n-type barrier layer 203, the active layer 204, the p-type barrier layer 205, and the p-type contact layer 206 in a side view of the semiconductor laminate. In other words, a step is provided between the n-type contact layer 202 and the n-type barrier layer 203. The n-type electrode 208 is formed on the upper surface of the n-type contact layer 202 yielded by this step, and the p-type electrode 209 is formed on the upper surface of the p-type contact layer 206. The upper surface of the substrate 201 and the sides and upper surface of the semiconductor laminate are covered by the passivation film 210. The upper portions of the n-type electrode 208 and the p-type electrode 209 are exposed from the passivation film 210.

The substrate 201 is made of GaAs. The buffer layer 207 is made of AlGaSb. The n-type contact layer 202 is made of InAsSb that includes Si (n-type dopant). The n-type barrier layer 203 is made of AlInAsSb that includes Si (n-type dopant). The active layer 204 is made of $InAs_xSb_{(1-x)}$ ($0 \leq x \leq 1$). The p-type barrier layer 205 is made of AlGaSb that includes Si (p-type dopant). The p-type contact layer 206 is made of GaSb or GaInSb that includes Si (p-type dopant). The n-type electrode 208 is made of Au/Ti. The p-type electrode 209 is made of Au/Ti. The passivation film 210 is made of silicon nitride.

The light emitter 3 is, for example, produced as follows. First, molecular beam epitaxy (MBE) is used to form the buffer layer 207, the n-type contact layer 202, the n-type barrier layer 203, the active layer 204, the p-type barrier layer 205, and the p-type contact layer 206 in this order on the upper surface of a GaAs wafer (substrate 201). Next, wet etching with acid, ion milling, or the like is used to partially remove the n-type barrier layer 203, the active layer 204, the p-type barrier layer 205, and the p-type contact layer 206 to form a step for contact between the n-type contact layer 202 and the n-type electrode 208. By this process, a plurality of semiconductor laminates having a step are formed on the GaAs wafer.

Next, mesa etching is performed on the plurality of semiconductor laminates having a step to separate the devices (individual LEDs). The n-type contact layer 202 and the buffer layer 207 appearing at the bottom of the step are partially removed sequentially to expose the upper surface of the substrate 201 at a device separation region. Next, the upper surface of the substrate 201 and the upper and side surfaces of the separated semiconductor laminate are covered by the passivation film 210, which is made of silicon nitride. Next, the portions of the passivation film 210 for forming the n-type electrode 208 and the p-type electrode 209 are etched to form through-holes. Au/Ti electrodes are then formed to fill the through-holes with a lift-off process or the like. The light emitter 3 is formed by these steps.

Hierarchical Structure of Light Receiver

The hierarchical structure of the light receiver 4 is the same as the hierarchical structure of the light emitter 3 illustrated in FIG. 29 and can be produced by the same method as the light emitter 3.

Lead Frame

The lead frame 15 can be produced with a known technique. For example, the lead frame 15 is formed by selectively etching the front and back surfaces of a copper (Cu) plate using photolithography and plating with nickel (Ni)-palladium (Pd)-gold (Au) or the like. A predetermined pattern is thus formed.

Method of Producing First Layer and Wall

The first layer 1 is configured by sealing the light emitter 3, the light receiver 4, the IC chip 5a, and the lead frame 15 with resin, such as epoxy. An adhesive sheet is used in producing the first layer 1. Resin tape that has both adhesiveness and heat resistance is used as the adhesive sheet. The adhesiveness is preferably achieved by a thinner adhesive layer. The heat resistance is preferably up to temperatures of approximately 150° C. or more to 200° C. or less. Polyimide tape that is heat resistant to approximately 280° C., for example, can be used as the adhesive sheet. Polyester tape, Teflon® tape, polyphenylene sulfide (PPS), glass cloth, Nomex paper, or the like can also be used as the adhesive sheet 51.

Figure 30:
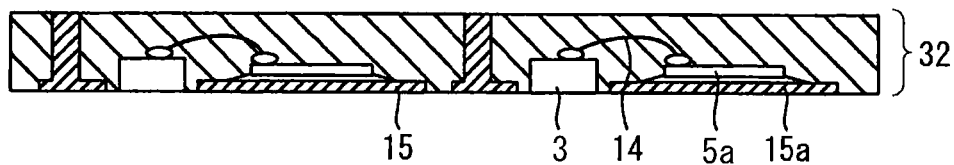
FIG. 30 is a cross-sectional diagram illustrating the schematic process of a method of producing the first layer.

FIGS. 30 to 33 are cross-sectional diagrams illustrating the schematic process of the method of producing the first layer 1. In FIGS. 30 to 33, locations that are not cross-sectional are depicted with solid lines. First, the lead frame 15, in which a plurality of lead terminals or the like are integrally formed, is attached to a non-illustrated adhesive sheet, and the light emitter 3 and light receiver 4 (not illustrated) are attached to the adhesive sheet. The IC chip 5a is fixed to an island formed integrally in the lead frame 15. The light emitter 3 and IC chip 5a, the light receiver 4 and IC chip 5a, and the IC chip 5a and lead frame 15 are connected by wires 14. A resin sealing layer 32 is formed as a sealing member to seal these components using a material that includes epoxy-based thermosetting resin and resists high temperatures during reflow. The resin sealing layer 32 may be formed by a known procedure to seal an object by filling a mold with resin. Next, the adhesive sheet is removed, and post-curing is performed (FIG. 30). The surface where the adhesive sheet was removed is in a state such that the light emitting surface of the light emitter 3, the light receiving surface of the light receiver 4, and the back surface of the island are exposed.

Figure 31:
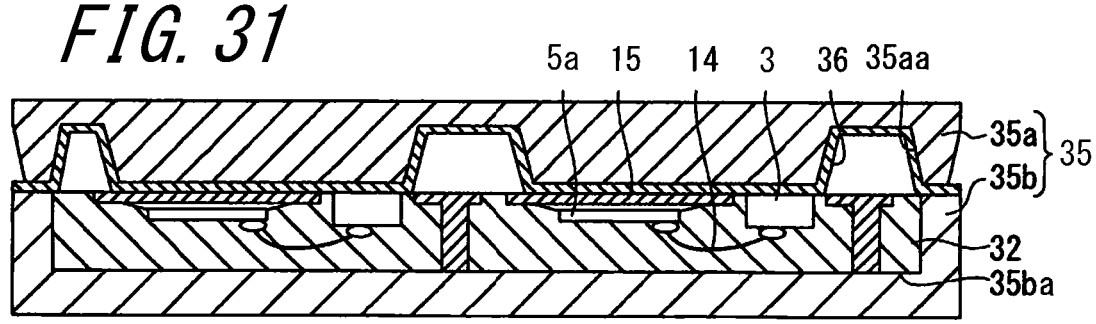
FIG. 31 is a cross-sectional diagram illustrating the schematic process of the method of producing the first layer.
Figure 32:
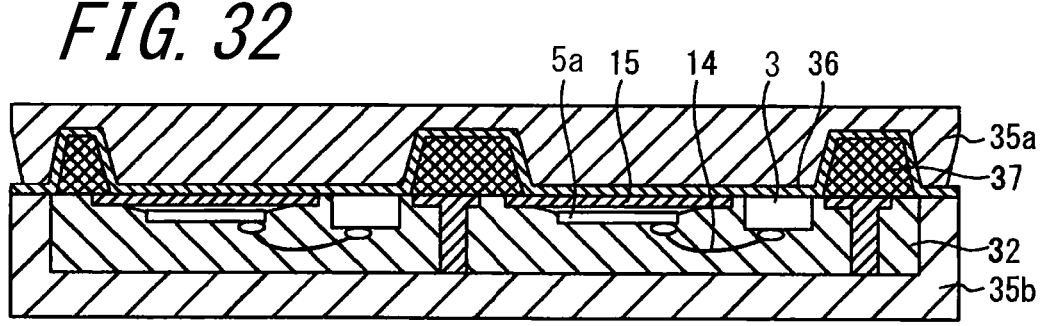
FIG. 32 is a cross-sectional diagram illustrating the schematic process of the method of producing the first layer.

Next, the wall 17 is produced. A mold 35 for wall 17 formation is used to form the wall 17 on the surface where the light emitting surface of the light emitter 3, the light receiving surface of the light receiver 4, and the like of the first layer 1 are exposed. The mold 35 for wall 17 formation includes an upper mold piece 35a and a lower mold piece 35b. The upper mold piece 35a is disposed on the surface of the resin sealing layer 32 of the first layer 1 at the side where the light emitting surface of the light emitter 3 and the light receiving surface of the light receiver 4 are exposed, and the lower mold piece 35b is disposed on the opposite surface. A plurality of recesses 35aa for forming the resin layer 37 that later becomes the wall 17 are formed on the upper mold piece 35a. The lower mold piece 35b includes a recess 35ba. A film 36 is disposed along the inside of the upper mold piece 35a, and the upper mold piece 35a is overlaid on the lower mold piece 35b so that the resin sealing layer 32 is housed in the recess 35ba, with the side where the light emitting surface of the light emitter 3 and the light receiving surface of the light receiver 4 are exposed facing upward (FIG. 31). At this time, a portion of the surface of the lead frame 15 and the upper mold piece 35a are in contact via the film 36. A sealing member made of melted epoxy resin or the like is injected from the side to fill the space surrounded by the upper mold piece 35a and the lower mold piece 35b. The resin layer 37 is thus formed (FIG. 32).

Next, when the upper mold piece 35a and the lower mold piece 35b are opened, the upper mold piece 35a and the film 36 integrally peel off from the resin layer 37 and the resin sealing layer 32. The resin sealing layer 32 with the resin layer 37 formed thereon is thus extracted (FIG. 33). Consequently, the resin layer 37 is formed on the surface of the resin sealing layer 32 where the light emitting surface of the light emitter 3 and the light receiving surface of the light receiver 4 are exposed.

Figure 34:
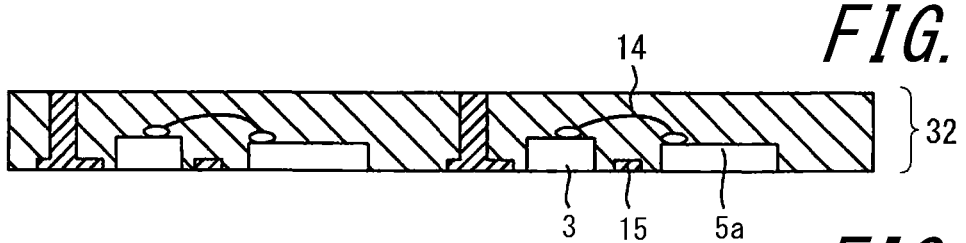
FIG. 34 is a cross-sectional diagram illustrating the schematic process of another example method of producing the first layer.
Figure 35:
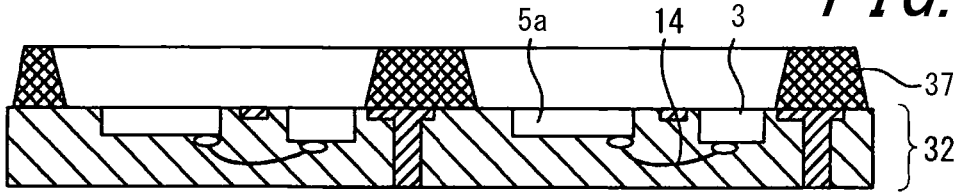
FIG. 35 is a cross-sectional diagram illustrating the schematic process of another example method of producing the first layer.

In FIGS. 30 to 33, the case of the IC chip 5a being disposed on an island included in the lead frame 15 has been described, but this example is not limiting. As illustrated in FIG. 34, the resin sealing layer 32 may be formed using a lead frame without an island. The resin layer 37 may then be formed on this resin sealing layer 32 by the same procedures as in FIGS. 30 to 33 (FIG. 35). In FIGS. 34 and 35, locations that are not cross-sectional are depicted with solid lines.

Method of Producing Second Layer

As illustrated in FIG. 27, the supports 84 and the waveguide 80 are formed on the silicon substrate 85 of the second layer 2. In the second layer 2, a silicon dioxide layer and a silicon layer are formed in this order on a Si wafer (silicon substrate 85). A portion of the silicon substrate 85 is then removed by etching or the like to form the supports 84 and the waveguide 80. An example of the size of the second layer 2 is a length of 4.3 mm in the x-axis direction, a length of 6.3 mm in the y-axis direction, and a length of 0.7 mm in the z-axis direction.

Figure 36:
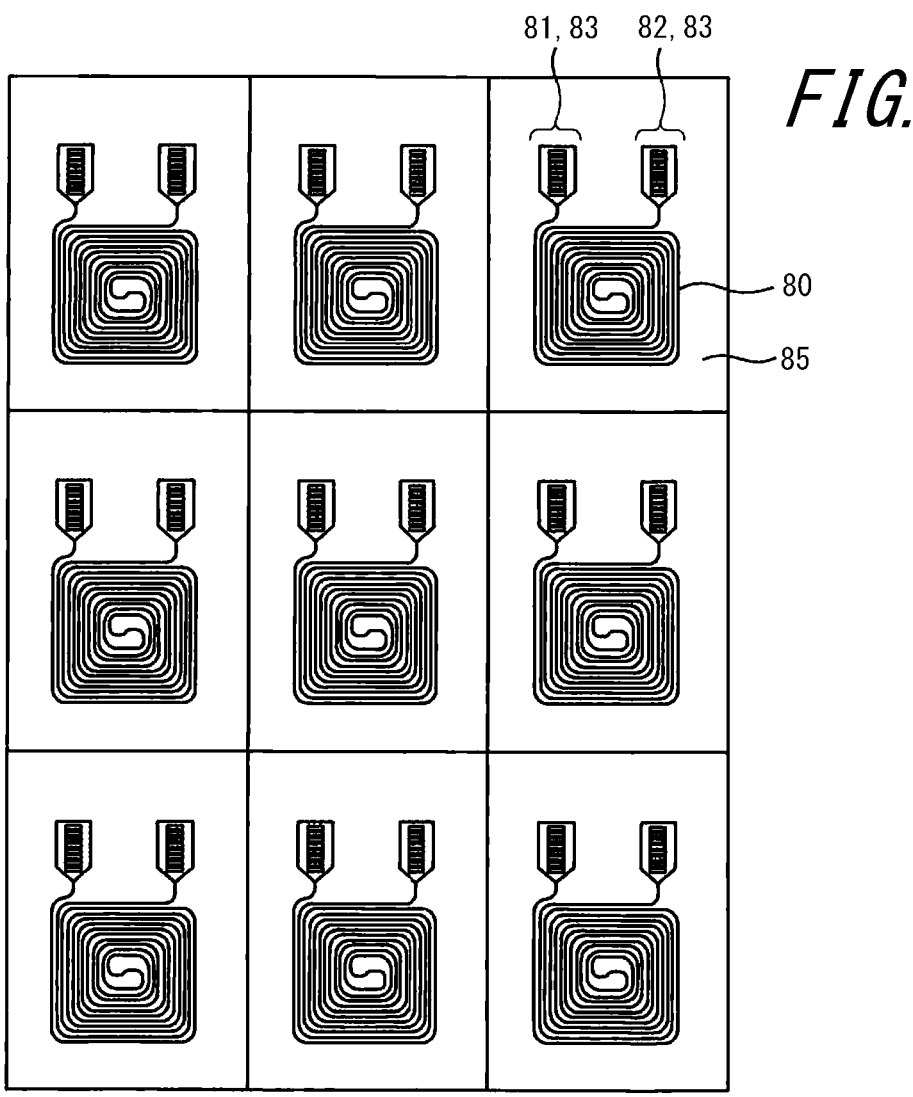
FIG. 36 is an example silicon substrate on which a plurality of second layers that have not yet been separated are formed.

The second layer 2 is formed by dicing a silicon substrate on which a plurality of second layers 2 have been formed, for example as illustrated in FIG. 36. The plurality of second layers 2 in FIG. 36 can be separated by the following method, for example. Dicing tape is attached to the surface on which the waveguide 80 is formed, and cutting marks are made on the opposite surface of the silicon substrate from the surface where the waveguide 80 is formed. The silicon substrate is positioned using the cutting marks and is cut with a dicing saw.

Separate second layers 2, as illustrated in FIG. 26, are thus produced. The second layers 2 can also be separated by the following method, since the waveguide 80 might be damaged during separation by a dicing saw that uses cutting water. Specifically, dry-laser cutting, i.e. Stealth dicing®

(Stealth dicing is a registered trademark in Japan, other countries, or both), may be used to separate the second layers 2. In greater detail, dicing tape is attached to the opposite surface of the silicon substrate from the surface where the waveguide 80 is formed. Stealth dicing is then performed by laser irradiation of the surface where the waveguide 80 is formed. Subsequently, the dicing tape is expanded. Separate second layers 2, as illustrated in FIG. 26, are thus formed.

Method of Attachment

Figure 37:
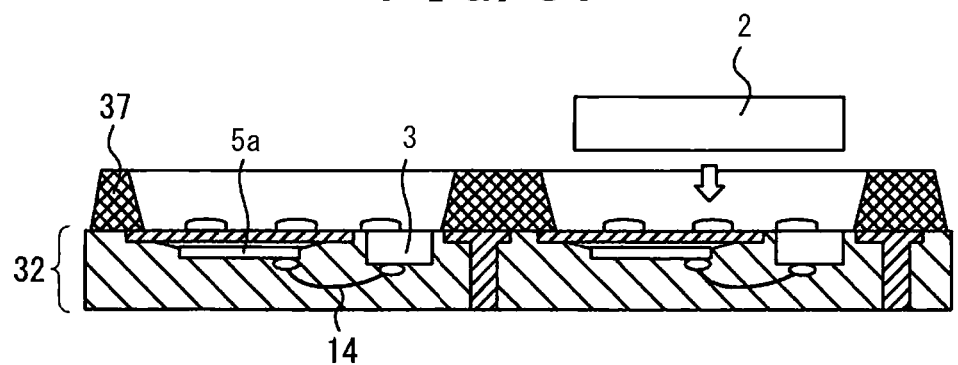
FIG. 37 is a cross-sectional diagram illustrating the schematic process of a method of attaching the first layer and the second layer.
Figure 38:
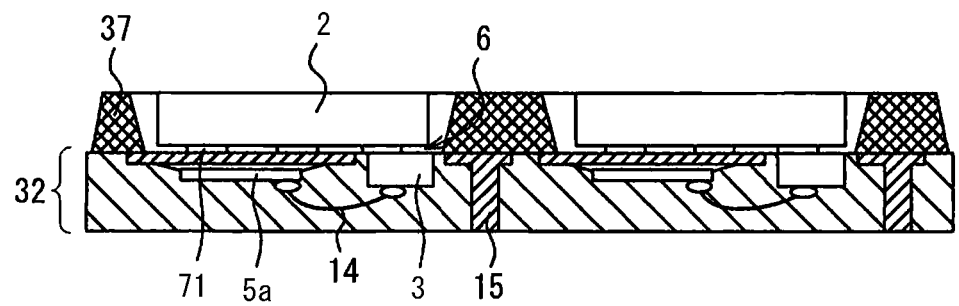
FIG. 38 is a cross-sectional diagram illustrating the schematic process of the method of attaching the first layer and the second layer.

The first layer 1 and the second layer 2 are attached so that the surface of the separated second layer 2 on the waveguide 80 side and the surface of the first layer 1 on the side where the light emitting surface of the light emitter 3 is exposed are opposite each other. FIGS. 37 and 38 are cross-sectional diagrams illustrating the schematic process of the method of attaching the first layer 1 and the second layer 2. In FIGS. 37 and 38, locations that are not cross-sectional are depicted with solid lines. First, a resin as an adhesive is applied with a syringe to the surface of the resin sealing layer 32, obtained by the process in FIG. 33, where the lead frame 15 is exposed. The resin is applied to positions other than the light emitting surface of the light emitter 3, the light receiving surface of the light receiver 4, and the area opposite the waveguide 80 to avoid contamination (FIG. 37).

The second layer 2 separated as illustrated in FIG. 26 is then adhered to the resin sealing layer 32 so that the surface on the waveguide 80 side is in contact with the resin. As illustrated in FIG. 38, the second layer 2 is therefore disposed in a region surrounded by the wall 17 of the first layer 1. Subsequently, one magazine at a time is placed in an oven and heated for 60 minutes at a temperature of 150° C. to heat cure the resin. Particle-containing resin is used here as the adhesive. Therefore, even if the first layer 1 and the second layer 2 are in contact, the particles included in the resin act as a spacer. A gap is thus formed between the first layer 1 and the second layer 2, as illustrated in FIG. 38, and the flow path 6 communicating with the waveguide 80 is formed in the second layer 2. Consequently, the gas to be measured can sufficiently absorb the evanescent wave extending from the waveguide 80. A die bonder may be used to dispose the second layer 2 on the first layer 1.

Figure 39:
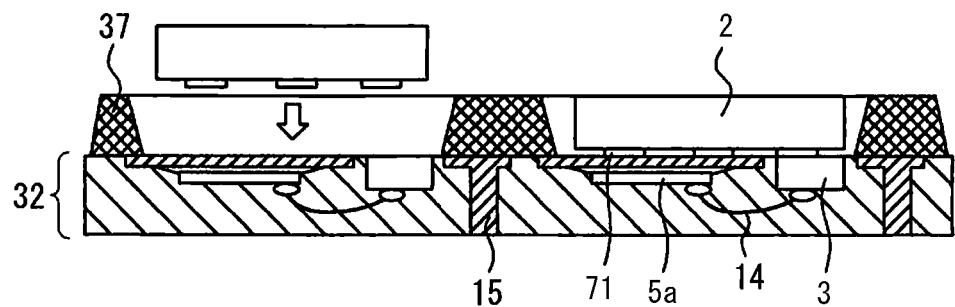
FIG. 39 is a cross-sectional diagram illustrating the schematic process of another example method of attaching the first layer and the second layer.

In FIGS. 37 and 38, the case of fixing the second layer 2 after applying resin to the first layer 1 has been described, but this example is not limiting. For example, as illustrated in FIG. 39, resin as an adhesive may be applied to the surface of the second layer 2 on the side where the waveguide 80 is formed. The resin is then pre-cured, and the second layer 2 is fixed so that the resin is in contact with the first layer 1. In this case, a flip chip bonder may be used to dispose the second layer 2 on the first layer 1. In FIG. 39, locations that are not cross-sectional are depicted with solid lines. Flip chip die bonding allows temporary bonding by application of a 20 gf or greater load for several tens of msec at a temperature of 80° C. or more to 120° C. or less. Post-curing is performed by placing one magazine at a time in an oven and heating for 60 minutes at a temperature of 150° C.

Attachment Process of Non-Woven Fabric

Figure 40:
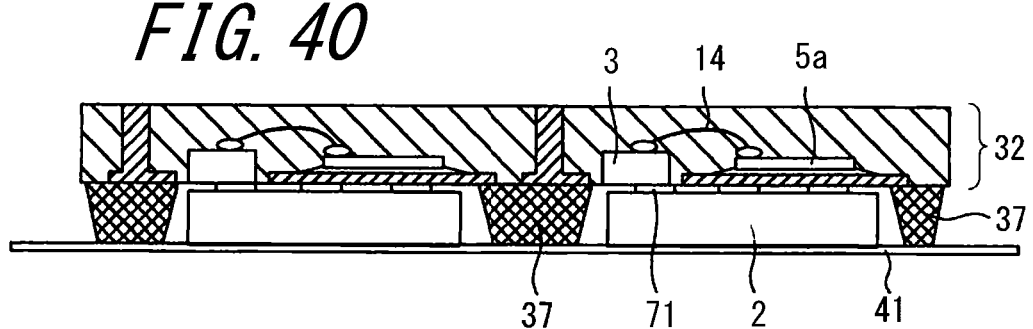
FIG. 40 is a cross-sectional diagram illustrating the schematic process of a method of attaching a non-woven fabric.
Figure 41:
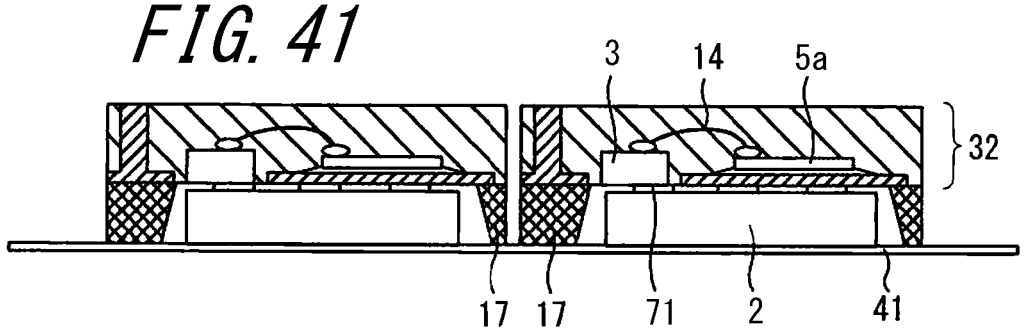
FIG. 41 is a cross-sectional diagram illustrating the schematic process of the method of attaching a non-woven fabric.
Figure 42:
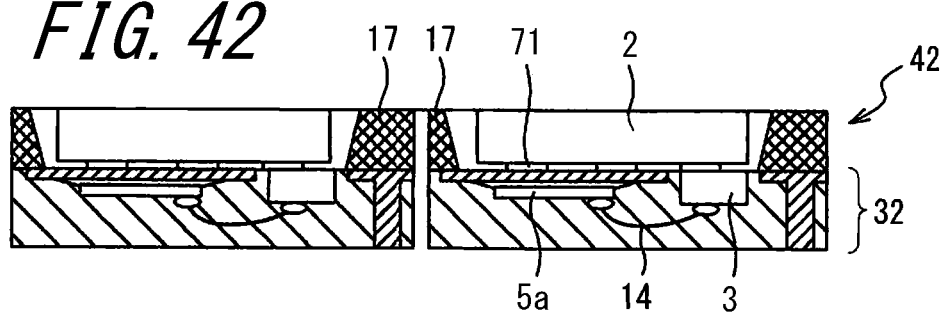
FIG. 42 is a cross-sectional diagram illustrating the schematic process of the method of attaching a non-woven fabric.

After the resin sealing layer 32 is separated into the first layers 1, the non-woven fabric 105 is attached so as to cover the opening surrounded by the wall 17. It suffices for the non-woven fabric 105 to be disposed to cover at least a portion of the opening surrounded by the wall 17 but is preferably disposed to cover the entire opening. FIGS. 40 to 43 are cross-sectional diagrams illustrating the schematic process of the method of attaching the non-woven fabric 105. In FIGS. 40 to 43, locations that are not cross-sectional are depicted with solid lines. First, the resin sealing layer 32, to which is attached the second layer 2 obtained by the process in FIG. 38, is attached to a dicing table 41 so that the second layer 2 and resin layer 37 side is in contact with the dicing table 41 (FIG. 40). Subsequently, the resin sealing layer 32 and the resin layer 37 are cut with a dicing saw to be split into chips 42 (FIG. 41). The resin layer 37 is split at this time to become the walls 17 of two adjacent gas detection apparatuses.

Figure 43:
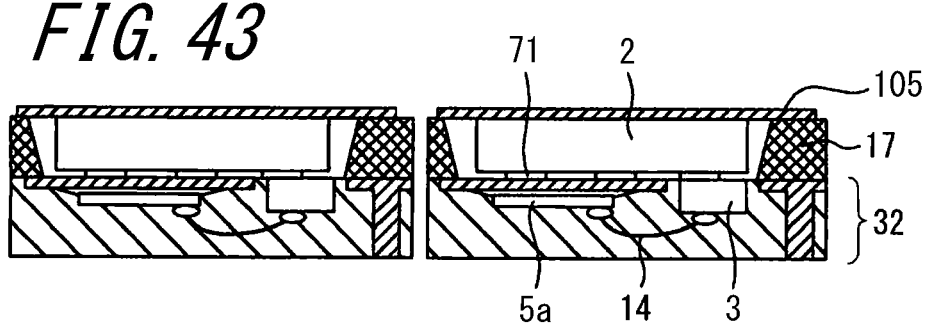
FIG. 43 is a cross-sectional diagram illustrating the schematic process of the method of attaching a non-woven fabric.

Subsequently, after the dicing table 41 is removed and the chips 42 are separated (FIG. 42), the non-woven fabric 105 is attached to the tip surface of the wall 17 of each chip 42 so as to cover the opening surrounded by the wall 17 (FIG. 43). The non-woven fabric 105 is, for example, fixed by adhesive. Here, the case of attaching the non-woven fabric 105 through a sequence of processes has been described, but this example is not limiting. For example, the gas detection apparatus 100 may be produced by producing the chip 42 through a sequence of processes, embedding the chip 42 into an apparatus provided with the gas detection apparatus 100, and subsequently attaching the non-woven fabric 105 to the embedded chip 42.

For example, when the gas detection apparatus 100 is mounted on a substrate by soldering or the like, a reflow process may be carried out for surface mounting. The non-woven fabric attached to the gas detection apparatus 100 might be damaged by the reflow. Therefore, a non-woven fabric with heat resistance needs to be selected as the non-woven fabric to attach to the gas detection apparatus 100, which restricts the non-woven fabrics that can be used. This restriction can be avoided by performing the reflow before attaching the non-woven fabric to the chip 42. This approach eliminates the need to consider damage during reflow when selecting a non-woven fabric, thereby enhancing usability.

Effects

In the gas detection apparatus 100 according to the present embodiment, the first layer 1, which includes the light emitter 3 and the light receiver 4, and the second layer 2, which includes the light input unit 81 and the light output unit 82 of the waveguide 80, are attached so that the light emitter 3 and the light input unit 81 are close to and opposite each other, and so that the light receiver 4 and the light output unit 82 are close to and opposite each other.

As illustrated in FIG. 43, the wall 17 is formed on the first layer 1, the second layer 2 is disposed in the region surrounded by the wall 17, and the tip surface of the wall 17 and the upper surface of the second layer 2 in FIG. 43 are formed to be flush. The second layer 2 can thus be protected by the wall 17. In particular, the first layer 1 and the second layer 2 are connected via the attachment portion 71, which is provided in parts, to form the flow path 6 between the first layer 1 and the second layer 2 in the gas detection apparatus 100 according to the present embodiment. Therefore, the connection between the first layer 1 and the second layer 2 may be weak as compared to when the first layer 1 and the second layer 2 are connected over the entire portion where the two layers overlap in a top view. Furthermore, the waveguide 80 is only supported partially by the supports 84 and therefore may have reduced strength with respect to a force acting on the side surface. Since the gas detection apparatus 100 according to the present embodiment includes the wall 17, however, the first layer 1 and the second layer 2 can be protected from the force acting on the side surface. Accordingly, if the gas detection apparatus 100 is bumped, for example, when the gas detection apparatus 100 is mounted or when another device or the like is mounted on the side where the gas detection apparatus 100 is mounted, the shock can be prevented from being transmitted to the second layer 2 and the waveguide 80.

The second layer 2 can thus be protected by provision of the wall 17, allowing a reduction in the contact area between the first layer 1 and the second layer 2. In other words, the gas detection apparatus 100 according to the present embodiment allows a reduction in the contact area between the first layer 1 and the second layer 2, which conventionally is a large area in anticipation of shocks or the like. Since the first and second layers can be miniaturized, the gas detection apparatus 100 can effectively be miniaturized, even with the increase in size due to the wall 17.

As illustrated in FIG. 43, the gas detection apparatus 100 includes the non-woven fabric 105 that covers the opening of the wall 17. In the gas detection apparatus 100, the first layer 1 and the second layer 2 are arranged so that the light emitter 3 provided in the first layer 1 and the light input unit 81 provided in the second layer 2 are as close as possible, or so that the light receiver 4 provided in the first layer 1 and the light output unit 82 provided in the second layer 2 are as close as possible. The gap between the first layer 1 and the second layer 2 becomes the flow path 6 of the gas to be measured, and the concentration of the gas is measured by absorption of the evanescent wave extending from the surface of the waveguide 80 when the gas to be measured passes through the flow path 6. Therefore, if foreign matter such as dust were to enter the flow path 6, impeding the flow of gas through the flow path 6, or if foreign matter or the like were to adhere to the waveguide 80, preventing the evanescent wave from being sufficiently absorbed, the detection accuracy of the gas detection apparatus 100 would decrease. Since the non-woven fabric 105 can prevent foreign matter or the like from entering the flow path 6, the gas detection apparatus 100 can prevent a reduction in the detection accuracy.

Modification to Second Embodiment

Breathable sheets are not limited to the non-woven fabric 105. Any sheet that allows gas to pass through while blocking dust, dirt, or the like can be adopted, such as a porous membrane. In the above embodiment, the case of first producing the resin sealing layer 32 and then producing the resin layer 37 by using the mold 35 for producing the wall 17 has been described, but this example is not limiting. For example, in the sealing process for producing the resin sealing layer 32, the resin sealing layer 32 may be produced to include the wall 17 integrally, or the wall 17 may be produced as a separate body and attached to the resin sealing layer 32. The material of the wall 17 is not limited to resin or the like and may be any material fixable to the resin sealing layer 32.

The non-woven fabric 105 may be omitted. For example, when the gas detection apparatus is provided inside a pipe through which the gas to be measured flows, a clean filter may be provided upstream from an inlet in the pipe for the gas to be measured, and the gas to be measured may be guided into the pipe through the clean filter. The non-woven fabric 105 consequently need not be provided in the gas detection apparatus 100. This configuration can eliminate the cost for providing the non-woven fabric 105.

The non-woven fabric 105 may also be omitted when the gas detection apparatus 100 is used in a clean room, for example, where dust or the like is absent.

Other

The present disclosure is not limited to the above embodiments and examples. A person of ordinary skill in the art could modify the design of each embodiment, and such modified embodiments are included in the scope of the present disclosure.

Appendix

[1] A gas sensor comprising:
a first layer comprising a light emitter that includes a light emitting surface configured to emit light and a light receiver that includes a light receiving surface on which light is incident, the first layer supporting the light emitter and the light receiver so that the light emitting surface and the light receiving surface face the same direction;
a second layer comprising a waveguide that includes a light input unit and a light output unit, light emitted from the light emitting surface being inputted to the light input unit, the light inputted to the light input unit being outputted from the light output unit towards the light receiving surface, the light emitting surface and the light receiving surface being opposite the waveguide with a predetermined gap therebetween; and
a wall provided on the first layer and surrounding at least a portion of the second layer in a top view.

[2] The gas sensor of [1], wherein in a side view, a tip surface of the wall is flush with or higher than a surface of the second layer opposite a surface on which the waveguide is formed.

[3] The gas sensor of [2], further comprising a breathable sheet covering an opening of the wall.

[4] The gas sensor of [3], wherein the sheet is a non-woven fabric or a porous membrane.

[5] The gas sensor of any one of [1] to [4], wherein the first layer and the second layer are connected via an attachment portion so as to form a gap therebetween, the gap becoming a flow path of a gas to be measured.

[6] The gas sensor of [5], wherein the attachment portion comprises an adhesive having mixed therein particles with a size of a predetermined value or greater.

[7] The gas sensor of any one of [1] to [6], wherein the first layer includes a sealing portion that seals the light emitter and the light receiver so that the light emitting surface and the light receiving surface are exposed.

[8] The gas sensor of any one of [1] to [7],
wherein the second layer includes a silicon substrate; and
wherein the waveguide is formed on one surface of the silicon substrate.

[9] The gas sensor of [8], further comprising a support between the silicon substrate and the waveguide.

[10] A gas detection apparatus comprising:
a first layer; and
a second layer disposed opposite the first layer in a predetermined direction;
wherein the first layer comprises
a light emitter configured to emit light; and
a light receiver configured to receive the light after the light passes through a waveguide;
wherein the second layer comprises
a light input unit of the waveguide opposite the light emitter in the predetermined direction; and
a light output unit of the waveguide opposite the light receiver in the predetermined direction;
wherein the first layer and the second layer are connected by an attachment portion, and a minimum interval between the first layer and the second layer is defined by a size of particles included in the attachment portion.

[11] The gas detection apparatus of [10], wherein the minimum interval between the first layer and the second layer is at least a predetermined value based on the size of the particles, and the predetermined value is calculated as the difference between an average A of the size of the particles and two times a standard deviation σ.

[12] The gas detection apparatus of [11], wherein the light emitter and the light receiver are rectangular, and a maximum interval between the first layer and the second layer is equal to or less than a maximum side length of the light emitter and the light receiver.

[13] The gas detection apparatus of [12], wherein the maximum interval between the first layer and the second layer is equal to or less than 0.5 times the maximum side length of the light emitter and the light receiver.

The invention claimed is:

1. A gas detection apparatus comprising:
a first layer; and
a second layer disposed opposite the first layer in a predetermined direction;
wherein the first layer comprises
a light emitter configured to emit light; and
a light receiver configured to receive the light after the light passes through a waveguide;
wherein the second layer comprises
a light input unit of the waveguide opposite the light emitter in the predetermined direction; and
a light output unit of the waveguide opposite the light receiver in the predetermined direction,
wherein the first layer is connected to the second layer by an attachment portion so as to form a vent communicating with the waveguide,
wherein the attachment portion comprises adhesive, and the adhesive comprises particles having a size of a predetermined value or greater.

2. The gas detection apparatus of claim 1, wherein the second layer comprises all of the waveguide.

3. The gas detection apparatus of claim 1, wherein the first layer comprises a terminal, and the attachment portion is provided in a line on the terminal.

4. The gas detection apparatus of claim 1,
wherein the vent is provided in a diagonal direction relative to the attachment portion; and
wherein a length of the vent is at least √2 times a width of the attachment portion.

5. The gas detection apparatus of claim 1, wherein the first layer comprises a controller configured to control at least one of the light emitter and the light receiver, the controller facing the waveguide in the predetermined direction.

6. The gas detection apparatus of claim 5, wherein the first layer comprises resin sealing the controller so that a back surface of the controller is exposed.

7. The gas detection apparatus of claim 1, wherein at least one of the light emitter, the waveguide, and the light receiver comprises an optical filter that transmits light of a specific wavelength.

8. The gas detection apparatus of claim 7, wherein the optical filter is provided on a surface, on the waveguide side, of at least one of the light emitter and the light receiver.

9. The gas detection apparatus of claim 1, wherein the light is infrared light.

10. The gas detection apparatus of claim 1, wherein the gas is at least one of water vapor, methane, propane, formaldehyde, carbon monoxide, carbon dioxide, nitric oxide, ammonium, sulfur dioxide, and alcohol.

11. A gas detection apparatus comprising:
a first layer; and
a second layer disposed opposite the first layer in a predetermined direction;
wherein the first layer comprises
a light emitter configured to emit light; and
a light receiver configured to receive the light after the light passes through a waveguide;
wherein the second layer comprises
a light input unit of the waveguide opposite the light emitter in the predetermined direction; and
a light output unit of the waveguide opposite the light receiver in the predetermined direction,
wherein the first layer comprises resin sealing the light emitter and the light receiver.

12. The gas detection apparatus of claim 11, wherein the light emitter is a light emitting diode, and the light receiver is a photodiode.

13. The gas detection apparatus of claim 12,
wherein the light emitting diode and the photodiode each comprise a semiconductor laminate formed on a principal surface of a substrate; and
wherein a surface of the substrate of the light emitting diode opposite the principal surface and a surface of the substrate of the photodiode opposite the principal surface are exposed from the resin.

14. The gas detection apparatus of claim 1, wherein the light receiver detects a concentration of a gas based on an amount of received light.

15. The gas detection apparatus of claim 1,
wherein the second layer comprises a silicon substrate; and
the waveguide, the light input unit, and the light output unit are formed on the silicon substrate.

16. A gas detection apparatus comprising:
a first layer; and
a second layer disposed opposite the first layer in a predetermined direction;
wherein the first layer comprises
a light emitter configured to emit light; and
a light receiver configured to receive the light after the light passes through a waveguide;
wherein the second layer comprises
a light input unit of the waveguide opposite the light emitter in the predetermined direction; and
a light output unit of the waveguide opposite the light receiver in the predetermined direction,
wherein the second layer comprises a silicon substrate; and
the waveguide, the light input unit, and the light output unit are formed on the silicon substrate,
wherein the second layer comprises a support between the silicon substrate and the waveguide.

17. The gas detection apparatus of claim 1, further comprising a wall provided on the first layer and surrounding at least a portion of the second layer in a top view.

18. A gas detection apparatus comprising:
a first layer; and
a second layer disposed opposite the first layer in a predetermined direction;
wherein the first layer comprises
a light emitter configured to emit light; and
a light receiver configured to receive the light after the light passes through a waveguide;
wherein the second layer comprises
a light input unit of the waveguide opposite the light emitter in the predetermined direction; and
a light output unit of the waveguide opposite the light receiver in the predetermined direction, the gas detection apparatus further comprising a wall provided on the first layer and surrounding at least a portion of the second layer in a top view, wherein in a side view, a tip surface of the wall is flush with or higher than a surface of the second layer opposite a surface on which the waveguide is formed.

19. The gas detection apparatus of claim 1, wherein the light emitter is a light emitting diode, and the light receiver is a photodiode.

20. The gas detection apparatus of claim 11, wherein the second layer comprises all of the waveguide.

* * * * *